United States Patent
Meyer et al.

(10) Patent No.: US 12,533,268 B2
(45) Date of Patent: Jan. 27, 2026

(54) REDUCED-LEAKAGE TAMPON

(71) Applicant: Tampro Inc., San Francisco, CA (US)

(72) Inventors: Greta Catherine Meyer, San Francisco, CA (US); Amanda Paige Calabrese, San Francisco, CA (US); Elijah John Sampson Zenger, New York, NY (US)

(73) Assignee: Tampro Inc., San Francisco, CA (US)

( * ) Notice: Subject to any disclaimer, the term of this patent is extended or adjusted under 35 U.S.C. 154(b) by 665 days.

(21) Appl. No.: 17/310,929

(22) PCT Filed: Feb. 26, 2020

(86) PCT No.: PCT/US2020/019971
§ 371 (c)(1),
(2) Date: Aug. 31, 2021

(87) PCT Pub. No.: WO2020/180571
PCT Pub. Date: Sep. 10, 2020

(65) Prior Publication Data
US 2022/0133549 A1 May 5, 2022

Related U.S. Application Data

(60) Provisional application No. 62/812,874, filed on Mar. 1, 2019.

(51) Int. Cl.
*A61F 13/20* (2006.01)

(52) U.S. Cl.
CPC ........ *A61F 13/208* (2013.01); *A61F 13/2022* (2013.01); *A61F 13/2031* (2013.01);
(Continued)

(58) Field of Classification Search
CPC ............... A61F 13/208; A61F 13/2022; A61F 13/2031; A61F 13/2034; A61F 13/2037;
(Continued)

(56) References Cited

U.S. PATENT DOCUMENTS 3,780,730 A * 12/1973 Weisman .................. A61F 6/08
128/834
3,818,912 A * 6/1974 Etz ...................... A61F 13/2085
604/904

(Continued)

FOREIGN PATENT DOCUMENTS

AU 2012257503 1/2016
BE 1021216 B1 * 8/2015
(Continued)

OTHER PUBLICATIONS

Tempo Tampon, site visited Jan. 16, 2021. Available from Internet. URL:https://cheddar.com/media/tempo-creates-new-product-to-address-the-tampon-leakage-issue. Year: 2019.
(Continued)

*Primary Examiner* — Rebecca E Eisenberg
*Assistant Examiner* — Cheng Fong Ted Yang
(74) *Attorney, Agent, or Firm* — Knobbe, Martens, Olson & Bear, LLP

(57) ABSTRACT

Tampons including an elongate body and a removal string extending from a removal end of the elongate body. The tampons may include an absorbent material and a spiral flow path that directs menses across the elongate body. The spiral flow path includes at least one complete turn around the longitudinal axis of the elongate body.

19 Claims, 10 Drawing Sheets

(52) U.S. Cl.
CPC ...... *A61F 13/2034* (2013.01); *A61F 13/2037* (2013.01); *A61F 13/2091* (2013.01); *A61F 13/2051* (2013.01); *A61F 13/206* (2013.01); *A61F 13/2094* (2013.01)

(58) Field of Classification Search
CPC .............. A61F 13/2091; A61F 13/2051; A61F 13/206; A61F 13/2094
See application file for complete search history.

(56) References Cited

U.S. PATENT DOCUMENTS

| | | | |
|---|---|---|---|
| 4,175,561 A * | 11/1979 | Hirschman | ......... A61F 13/2051 28/106 |
| 4,328,804 A | 5/1982 | Shimatani | |
| 4,335,720 A | 6/1982 | Glassman | |
| 4,335,721 A | 6/1982 | Matthews | |
| 4,412,833 A | 11/1983 | Wiegner et al. | |
| 4,453,925 A | 6/1984 | Decker | |
| 5,047,024 A | 9/1991 | Glassman | |
| 5,084,038 A | 1/1992 | Sheldon et al. | |
| 5,153,971 A | 10/1992 | Iten | |
| 5,185,010 A | 2/1993 | Brown, Jr. | |
| 5,201,326 A | 4/1993 | Kubicki et al. | |
| 5,374,258 A * | 12/1994 | Lloyd | ................. A61F 13/2051 604/363 |
| D354,561 S | 1/1995 | Tostrup | |
| 5,403,300 A * | 4/1995 | Howarth | ............. A61F 13/2051 604/358 |
| 5,592,725 A | 1/1997 | Brinker | |
| 5,659,934 A | 8/1997 | Jessup et al. | |
| 5,807,372 A | 9/1998 | Balzar | |
| 5,813,102 A | 9/1998 | Leutwyler et al. | |
| D401,385 S | 11/1998 | Mintz | |
| 5,832,576 A | 11/1998 | Leutwyler et al. | |
| D401,735 S | 12/1998 | Rom | |
| 5,873,971 A | 2/1999 | Balzar | |
| 5,891,081 A | 4/1999 | McNellis et al. | |
| 5,891,123 A | 4/1999 | Balzar | |
| 5,909,884 A | 6/1999 | Schwankhart | |
| 5,911,712 A | 6/1999 | Leutwyler et al. | |
| D415,565 S | 10/1999 | Hayes et al. | |
| 6,039,716 A | 3/2000 | Jessup et al. | |
| 6,152,905 A | 11/2000 | Osborn, III et al. | |
| 6,177,608 B1 | 1/2001 | Weinstrauch | |
| 6,186,995 B1 | 2/2001 | Tharpe, Jr. | |
| 6,310,269 B1 * | 10/2001 | Friese | ................... B30B 11/007 28/118 |
| 6,433,246 B1 | 8/2002 | Nguyen et al. | |
| D477,075 S | 7/2003 | Schoelling | |
| D485,354 S | 1/2004 | Carlin et al. | |
| D492,033 S | 6/2004 | Jarmon et al. | |
| 6,743,212 B1 | 6/2004 | Cole et al. | |
| 6,748,634 B2 | 6/2004 | Nguyen et al. | |
| 6,874,394 B1 | 4/2005 | Hull, Jr. et al. | |
| 6,889,409 B2 | 5/2005 | Friese et al. | |
| 6,939,340 B1 * | 9/2005 | Berges | ................ A61F 13/2051 604/385.18 |
| 6,953,456 B2 | 10/2005 | Fuchs et al. | |
| D511,572 S | 11/2005 | Weber et al. | |
| D511,829 S | 11/2005 | Phipps et al. | |
| D511,830 S | 11/2005 | Turchi et al. | |
| D511,831 S | 11/2005 | Turchi et al. | |
| D511,832 S | 11/2005 | Bellofatto et al. | |
| D512,142 S | 11/2005 | Weber et al. | |
| D512,143 S | 11/2005 | Weber et al. | |
| D512,144 S | 11/2005 | Weber et al. | |
| D512,145 S | 11/2005 | Turchi et al. | |
| D512,146 S | 11/2005 | Phipps et al. | |
| D513,321 S | 12/2005 | Turchi et al. | |
| D514,700 S | 2/2006 | Weber et al. | |
| D515,212 S | 2/2006 | Edgett et al. | |
| D517,210 S | 3/2006 | Weber et al. | |
| D517,691 S | 3/2006 | Turchi et al. | |
| D517,692 S | 3/2006 | Weber et al. | |
| 7,059,026 B2 | 6/2006 | Friese et al. | |
| 7,060,057 B2 | 6/2006 | Policappelli | |
| 7,070,585 B2 | 7/2006 | Jensen | |
| D559,983 S | 1/2008 | Edgett et al. | |
| D568,472 S | 5/2008 | Sargent, Jr. et al. | |
| D568,995 S | 5/2008 | Sargent, Jr. et al. | |
| D572,362 S | 7/2008 | Edgett et al. | |
| D602,153 S | 10/2009 | Osterberg | |
| D615,202 S | 5/2010 | Edgett et al. | |
| 7,713,253 B2 | 5/2010 | Osborn, III et al. | |
| D620,592 S | 7/2010 | VanDenBogart et al. | |
| 7,833,210 B2 | 11/2010 | Schoelling | |
| D631,153 S | 1/2011 | McGlothlin et al. | |
| 7,977,532 B2 | 7/2011 | Hasse et al. | |
| 7,994,387 B2 | 8/2011 | Minoguchi et al. | |
| D647,610 S | 10/2011 | Smet | |
| D647,611 S | 10/2011 | Smet | |
| D647,612 S | 10/2011 | Smet | |
| 8,029,485 B2 | 10/2011 | Jensen | |
| 8,048,053 B2 | 11/2011 | Minoguchi et al. | |
| 8,082,639 B2 | 12/2011 | Rolli | |
| D655,058 S | 2/2012 | Blair | |
| D662,168 S | 6/2012 | Sims et al. | |
| D662,590 S | 6/2012 | Sanoi et al. | |
| 8,221,371 B2 | 7/2012 | Junio et al. | |
| 8,353,890 B2 | 1/2013 | Schoelling | |
| 8,403,879 B2 | 3/2013 | Schoelling | |
| 8,460,262 B2 * | 6/2013 | Fung | ................... A61F 13/2051 604/385.18 |
| 8,468,662 B2 | 6/2013 | Rolli et al. | |
| 8,474,114 B2 | 7/2013 | Rolli | |
| 8,475,425 B2 | 7/2013 | Hasse et al. | |
| D690,806 S | 10/2013 | Nakayama et al. | |
| 8,568,381 B2 | 10/2013 | Mueller et al. | |
| 8,574,210 B2 | 11/2013 | Ingelgem et al. | |
| D697,610 S | 1/2014 | Young | |
| D698,451 S | 1/2014 | Tai | |
| D701,600 S | 3/2014 | Kauffman | |
| 8,702,670 B2 | 4/2014 | Biggs et al. | |
| 8,735,647 B2 | 5/2014 | Schoelling | |
| 8,747,378 B2 | 6/2014 | Van Ingelgem et al. | |
| D709,610 S | 7/2014 | Pick | |
| 8,771,248 B2 | 7/2014 | Watanabe et al. | |
| 8,777,916 B2 | 7/2014 | Ingelgem et al. | |
| D713,029 S | 9/2014 | Shiraishi et al. | |
| 8,827,974 B2 | 9/2014 | Schmidt-Forst | |
| 8,827,975 B2 | 9/2014 | Kimball et al. | |
| 8,834,438 B2 | 9/2014 | Kinoshita et al. | |
| 8,834,439 B2 | 9/2014 | Kimball et al. | |
| 8,864,732 B2 | 10/2014 | Van Ingelgem et al. | |
| D717,430 S | 11/2014 | Shiraishi et al. | |
| D717,950 S | 11/2014 | Agrawal | |
| 8,882,734 B2 | 11/2014 | Drevik | |
| D719,653 S | 12/2014 | Agrawal | |
| 8,905,989 B2 | 12/2014 | Fung et al. | |
| 8,916,015 B2 | 12/2014 | McDaniel et al. | |
| D721,218 S | 1/2015 | Rogers et al. | |
| 8,938,866 B2 | 1/2015 | Amundson et al. | |
| 9,050,215 B2 | 6/2015 | Zabret | |
| 9,078,787 B2 | 7/2015 | Gehling et al. | |
| 9,125,771 B2 | 9/2015 | Schoelling | |
| 9,138,355 B2 | 9/2015 | Hasse et al. | |
| D741,479 S | 10/2015 | Agrawal | |
| D741,480 S | 10/2015 | Chavan et al. | |
| 9,155,666 B2 | 10/2015 | Smet et al. | |
| 9,168,184 B2 | 10/2015 | Kimball et al. | |
| 9,173,778 B2 | 11/2015 | Schoelling | |
| 9,205,004 B2 | 12/2015 | Watanabe et al. | |
| 9,211,216 B2 | 12/2015 | McDaniel et al. | |
| 9,211,217 B2 | 12/2015 | Tomosovic et al. | |
| 9,308,134 B2 | 4/2016 | Wolter et al. | |
| 9,610,201 B2 | 4/2017 | Schmidt-Forst et al. | |
| D789,651 S | 6/2017 | Wilson et al. | |
| D793,650 S | 8/2017 | Herrenbruck | |
| D804,655 S | 12/2017 | Holliday et al. | |
| 9,849,041 B2 | 12/2017 | Wolter et al. | |
| 9,861,535 B2 | 1/2018 | Mueller | |
| 9,877,877 B2 | 1/2018 | Edgett et al. | |
| D816,839 S | 5/2018 | Buell et al. | |

(56) References Cited

U.S. PATENT DOCUMENTS

| | | |
|---|---|---|
| D817,894 S | 5/2018 | Ganske |
| D818,130 S | 5/2018 | Jacobson |
| D819,206 S | 5/2018 | Buell |
| D819,813 S | 6/2018 | Buell et al. |
| 10,010,456 B2 | 7/2018 | Kimball et al. |
| 10,010,457 B2 | 7/2018 | Kimball et al. |
| D827,849 S | 9/2018 | Marshall |
| 10,076,452 B2 | 9/2018 | Jorgensen et al. |
| 10,098,793 B2 | 10/2018 | Schoelling |
| D834,189 S | 11/2018 | Cohen et al. |
| D839,737 S | 2/2019 | Pinard |
| D842,492 S | 3/2019 | Lurchenko |
| D842,993 S | 3/2019 | Buell et al. |
| D844,281 S | 4/2019 | Erol |
| 10,245,189 B2 | 4/2019 | Schoelling |
| 10,342,712 B1 | 7/2019 | McCrory |
| D861,186 S | 9/2019 | Matsuura et al. |
| D861,909 S | 10/2019 | Cheung |
| D868,989 S | 12/2019 | Marshall |
| D872,861 S | 1/2020 | Adams |
| D876,047 S | 2/2020 | Herrenbruck |
| 10,596,046 B2 | 3/2020 | Jorgensen et al. |
| D882,766 S | 4/2020 | Baik et al. |
| D884,881 S | 5/2020 | Kimball |
| 10,667,959 B2 | 6/2020 | Gehling et al. |
| D890,922 S | 7/2020 | Baik et al. |
| D927,686 S | 8/2021 | Calabrese et al. |
| 11,154,430 B2 | 10/2021 | Edgett et al. |
| 11,285,052 B2 | 3/2022 | Cohen et al. |
| 11,395,770 B2 | 7/2022 | Kimball |
| D977,632 S | 2/2023 | Meyer et al. |
| D1,046,123 S | 10/2024 | Meyer et al. |
| 2002/0151859 A1* | 10/2002 | Schoelling ........... A61F 13/2051 604/385.17 |
| 2003/0055391 A1* | 3/2003 | Nguyen ............... A61F 13/2085 604/374 |
| 2003/0093049 A1 | 5/2003 | Johnson |
| 2003/0149416 A1 | 8/2003 | Cole et al. |
| 2003/0208179 A1 | 11/2003 | Fuchs et al. |
| 2003/0233813 A1 | 12/2003 | Leslie et al. |
| 2005/0080393 A1 | 4/2005 | Policappelli |
| 2005/0096619 A1 | 5/2005 | Costa |
| 2005/0096620 A1 | 5/2005 | Awolin et al. |
| 2005/0113780 A1* | 5/2005 | Gatto ....................... A61F 13/28 604/385.17 |
| 2005/0113783 A1* | 5/2005 | Carlin ................. A61F 13/2051 604/385.18 |
| 2005/0113787 A1* | 5/2005 | Carlin ................. A61F 13/2051 604/385.18 |
| 2005/0113788 A1* | 5/2005 | Carlin ................. A61F 13/2051 604/385.18 |
| 2005/0113807 A1* | 5/2005 | Carlin ................. A61F 13/2051 604/904 |
| 2005/0177090 A1* | 8/2005 | Jensen ................ A61F 13/2051 604/14 |
| 2005/0193536 A1* | 9/2005 | Ingelgem ............. A61F 13/206 28/118 |
| 2006/0025742 A1 | 2/2006 | Hasse et al. |
| 2006/0025743 A1 | 2/2006 | Hasse et al. |
| 2006/0167428 A1* | 7/2006 | Denti ..................... A61F 15/003 604/385.17 |
| 2006/0185136 A1 | 8/2006 | Friese et al. |
| 2007/0073257 A1 | 3/2007 | Buck et al. |
| 2007/0083182 A1* | 4/2007 | Schoelling ........... A61F 13/2051 604/385.18 |
| 2008/0077106 A1 | 3/2008 | Minoguchi et al. |
| 2008/0154222 A1* | 6/2008 | Chaffringeon ........... A61F 13/34 604/385.18 |
| 2008/0200892 A1* | 8/2008 | Van Ingelgem .... A61F 13/2051 604/385.18 |
| 2008/0200895 A1 | 8/2008 | Minoguchi et al. |
| 2008/0221502 A1* | 9/2008 | Binner ................ A61F 13/2085 604/385.18 |
| 2009/0024103 A1* | 1/2009 | Van Ingelgem .... A61F 13/2051 604/385.18 |
| 2009/0105678 A1* | 4/2009 | Minoguchi ......... A61F 13/2051 604/385.18 |
| 2010/0121251 A1* | 5/2010 | Van Ingelgem .... A61F 13/2051 604/385.18 |
| 2010/0152642 A1* | 6/2010 | Kim ....................... A61F 13/49 604/385.18 |
| 2010/0205792 A1* | 8/2010 | Schoelling ........ A61F 13/15203 28/118 |
| 2011/0046571 A1* | 2/2011 | Waldhorn ............... A61F 13/42 604/246 |
| 2011/0092940 A1* | 4/2011 | Fung ................... A61F 13/2051 604/385.18 |
| 2011/0238028 A1* | 9/2011 | Smet ................... A61F 13/2085 604/385.17 |
| 2012/0010587 A1* | 1/2012 | Smet ................... A61F 13/2085 28/118 |
| 2012/0089111 A1* | 4/2012 | Magnusson ......... A61F 13/2031 604/385.18 |
| 2012/0130335 A1* | 5/2012 | Zabret ................ A61F 13/2051 604/385.18 |
| 2012/0137479 A1* | 6/2012 | Rolli ................... A61F 13/2034 28/118 |
| 2012/0143163 A1* | 6/2012 | Ng ....................... A61F 13/4704 604/385.101 |
| 2012/0165599 A1* | 6/2012 | Ellefson ................... A61F 13/34 600/29 |
| 2012/0187600 A1 | 7/2012 | Graber |
| 2012/0227228 A1* | 9/2012 | Schoelling .......... A61F 13/2085 28/118 |
| 2013/0110074 A1* | 5/2013 | Smet ................... A61F 13/2088 100/232 |
| 2013/0160259 A1* | 6/2013 | McDaniel .......... A61F 13/2022 28/120 |
| 2014/0066871 A1 | 3/2014 | Shepard et al. |
| 2014/0066874 A1* | 3/2014 | Hopkins ........... A61F 13/51394 604/378 |
| 2014/0088539 A1* | 3/2014 | Kimball ............. A61F 13/2088 604/385.18 |
| 2014/0088540 A1* | 3/2014 | Kimball ............. A61F 13/2022 604/385.18 |
| 2014/0188064 A1 | 7/2014 | Yamaki |
| 2014/0276523 A1* | 9/2014 | Schoelling ........ A61F 13/15203 604/385.17 |
| 2014/0358105 A1* | 12/2014 | Schmidt ................ A61F 13/206 604/375 |
| 2015/0005667 A1* | 1/2015 | Zavala .................... A61F 13/34 600/575 |
| 2016/0022507 A1* | 1/2016 | Kimball ............... A61F 13/2034 28/119 |
| 2016/0022508 A1* | 1/2016 | Kimball ............... A61F 13/2091 28/118 |
| 2016/0136005 A1* | 5/2016 | Pelley ................. A61F 13/2022 264/263 |
| 2016/0235583 A1 | 8/2016 | Durling et al. |
| 2017/0216102 A1* | 8/2017 | Hilt ...................... A61F 13/2037 |
| 2017/0231831 A1* | 8/2017 | Hilt ...................... A61F 13/2054 264/259 |
| 2018/0078427 A9* | 3/2018 | Schoelling .......... A61F 13/2051 |
| 2018/0207036 A1* | 7/2018 | Chien ................... A61F 13/266 |
| 2018/0333308 A1* | 11/2018 | Zhu ......................... A61L 15/50 |
| 2019/0099303 A1 | 4/2019 | Viens et al. |
| 2019/0216655 A1* | 7/2019 | Gehling ............. A61F 13/2091 |
| 2019/0269561 A1* | 9/2019 | Cohen ...................... A61F 13/34 |
| 2019/0314213 A1 | 10/2019 | Graham |
| 2020/0163806 A1 | 5/2020 | Jorgensen et al. |
| 2020/0289344 A1* | 9/2020 | Martinez ................ A61F 13/202 |
| 2020/0306098 A1 | 10/2020 | Lin |
| 2021/0007904 A1 | 1/2021 | Kimball |
| 2021/0093486 A1 | 4/2021 | Buschhaus et al. |
| 2021/0093487 A1 | 4/2021 | Brooks et al. |
| 2021/0220184 A1 | 7/2021 | Milanova |
| 2022/0047428 A1 | 2/2022 | Helvits et al. |
| 2022/0051228 A1 | 2/2022 | Guo et al. |

(56) References Cited

U.S. PATENT DOCUMENTS

| | | | |
|---|---|---|---|
| 2022/0211555 A1 | 7/2022 | Buschhaus et al. | |
| 2023/0051364 A1 | 2/2023 | Vendrell Vila | |
| 2023/0372573 A1 | 11/2023 | Blasius et al. | |

FOREIGN PATENT DOCUMENTS

| | | | |
|---|---|---|---|
| CN | 103705346 | 11/2018 | |
| EP | 685213 | 10/2001 | |
| EP | 1022004 | 12/2003 | |
| EP | 1481656 | 1/2004 | |
| EP | 1459720 A1 * | 9/2004 | ......... A61F 13/2051 |
| EP | 1481656 A1 * | 12/2004 | ......... A61F 13/2051 |
| EP | 1547555 | 6/2005 | |
| EP | 1244402 | 7/2006 | |
| EP | 1683503 | 7/2006 | |
| EP | 1383453 | 8/2006 | |
| EP | 1759678 A1 * | 3/2007 | ......... A61F 13/2051 |
| EP | 1765242 | 3/2007 | |
| EP | 2184044 | 5/2010 | |
| EP | 1304094 | 3/2011 | |
| EP | 1304095 | 3/2011 | |
| EP | 2311419 | 4/2011 | |
| EP | 2285329 | 5/2013 | |
| EP | 2417954 | 7/2013 | |
| EP | 1759678 | 3/2014 | |
| EP | 2740448 A1 * | 6/2014 | ......... A61F 13/2042 |
| EP | 2629726 | 10/2015 | |
| EP | 3156022 | 4/2017 | |
| EP | 2740448 | 10/2017 | |
| EP | 3181105 | 6/2018 | |
| GB | 6122615 | 2/2021 | |
| JP | 2004089576 | 3/2004 | |
| JP | 2004089576 A * | 3/2004 | |
| JP | D 2021-04281 | 7/2022 | |
| WO | WO 2000/053141 | 9/2000 | |
| WO | WO 2001/047458 | 7/2001 | |
| WO | WO-02078586 A2 * | 10/2002 | ........... B30B 11/007 |
| WO | WO 2005/077312 | 8/2005 | |
| WO | WO 2006/099944 | 9/2006 | |
| WO | WO 2008/135925 | 11/2008 | |
| WO | WO 2008/148396 | 12/2008 | |
| WO | WO-2009129910 A1 * | 10/2009 | ......... A61F 13/2037 |
| WO | WO 2010/069908 | 6/2010 | |
| WO | WO 2011/002357 | 1/2011 | |
| WO | WO 2012/053986 | 4/2012 | |
| WO | WO 2021/250436 | 12/2016 | |
| WO | WO 2018/202382 | 11/2018 | |
| WO | WO 2020/180571 | 9/2020 | |
| WO | WO 2020/253971 | 12/2020 | |
| WO | WO 2021/029829 | 2/2021 | |
| WO | WO 2022/051228 | 3/2022 | |
| WO | WO 2022/081096 | 4/2022 | |
| WO | WO 2024/226991 | 10/2024 | |

OTHER PUBLICATIONS

International Search Report and Written Opinion in PCT Application No. PCT/US 20/19971, dated Jun. 4, 2020.

Sequel, trysequel.com/, [online], [site visited Feb. 23, 2022], Available from internet URL: https://www.trysequel.com/ (Year: 2022).

Veeda 100% Natural Cotton Applicator Free Tampons, first available Jan. 6, 2014, amazon.com, [online], [site visited 02/23/V 2022], Available from internet URL: https://www.amazon.comNeeda-Hypoallergenic-Biodegradable-Unscented-Applicator/dp/B00HNMIPDW/ref=sr_1_131 ?crid=1341688HYHLDM&keyw%E2%80%A6 (Year: 2014).

O.b. Applicator Free Digital Tampons, first available Dec. 29, 2010, amazon.com, [online], [site visited Feb. 23, 2022], Availablew from internet URL: https://www.amazon.com/b-Applicator-Digital-Super-Plus/dp/BOONJ NJCBI/ref=sr_1_121 ?crid=1341688HYH LDM &keywords=tampon&qid=164562670%E2%80%A6 (Year: 2010).

Australian Standard®, Tampons—Menstrual, AS 2869-20081.

Communication of Notice of Opposition dated Jun. 3, 2025, against European Patent No. 3,930,652 B1.

Mintel extract for Tampax Compak Super and Regular Tampons Duo Pack, GNPD 12732032.

* cited by examiner

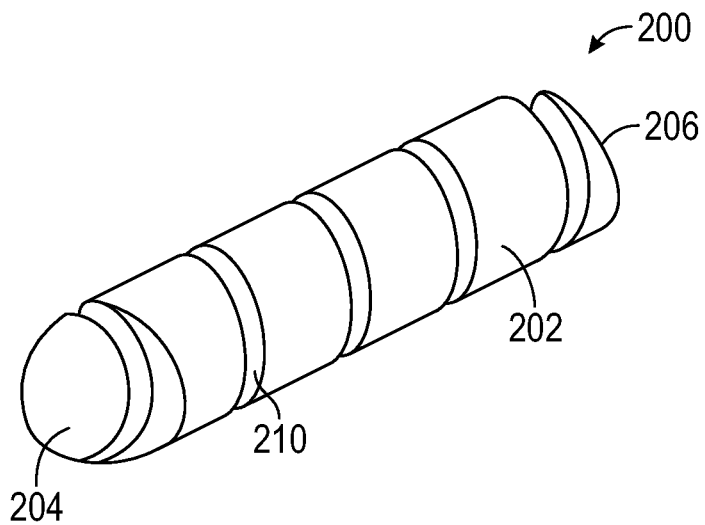
FIG. 6A
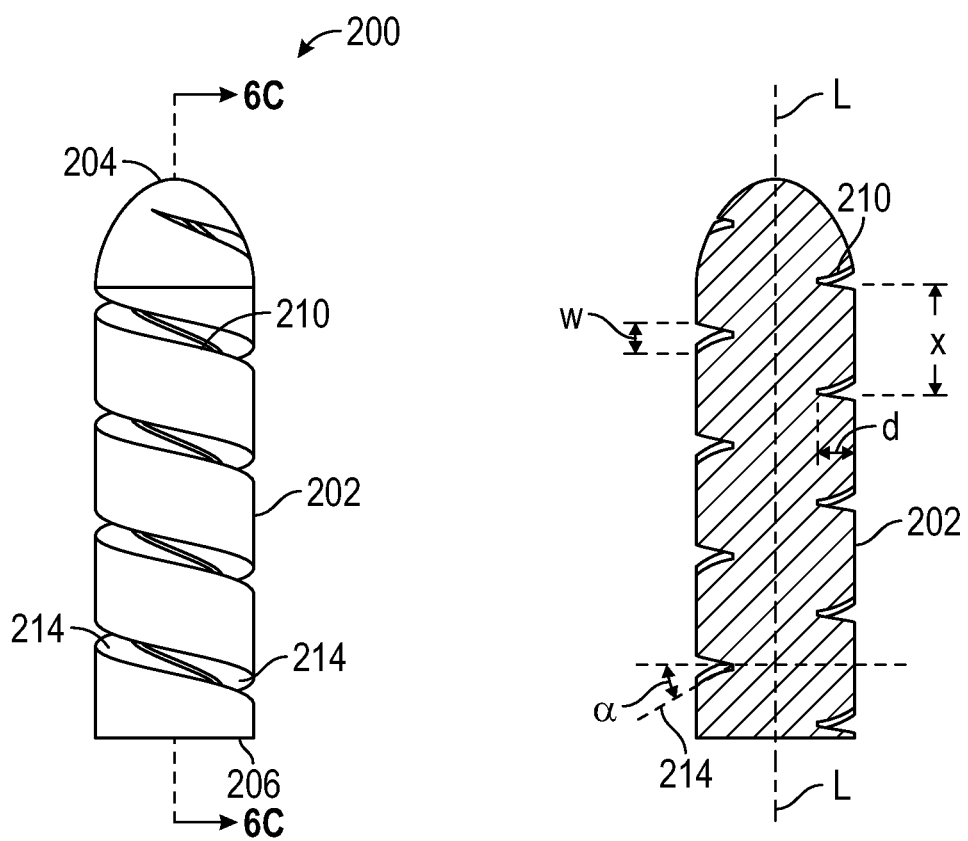
FIG. 6B  FIG. 6C

REDUCED-LEAKAGE TAMPON

INCORPORATION BY REFERENCE TO ANY PRIORITY APPLICATIONS

This application claims the benefit of U.S. Provisional Application No. 62/812,874, filed Mar. 1, 2019, titled "TAMPON WITH LATITUDINAL SPIRAL GROOVES AND BAMBOO-COTTON MATERIAL BLEND," which is hereby incorporated by reference in its entirety herein.

Any and all applications for which a foreign or domestic priority claim is identified in the Application Data Sheet as filed with the present application are hereby incorporated by reference under 37 C.F.R. § 1.57.

BACKGROUND

Field

The present disclosure relates to tampons for feminine hygiene.

Description of the Related Art

Tampons are most commonly used to retain menstrual fluid and tissue. The fluid and tissue is absorbed and held by the tampon for a certain amount of time. After this period, the tampon is removed and a new tampon is used if the user desires.

SUMMARY

Tampons are often made of compressed absorbent fibers with a cover layer. Existing tampons include longitudinal grooving or channeling on the outside of tampons to direct a flow of menses (see FIG. 1). Within the space, however, there is still a large problem with tampons leaking before reaching significant levels of saturation and not performing as well as necessary. As a result, women have to constantly think about their tampons. This can be particularly stressful in a public setting, for example at the workplace or on the athletic field.

Tampons with the absorbent materials and flow paths described herein produce a more efficiently and evenly absorbing tampon. In several embodiments, the absorbent material absorbs the less viscous menstrual material, while the flow path redirects the more viscous menstrual material as it travels down the elongate body of the tampon in order to give it more time to absorb.

In several embodiments, the tampons described herein have one or more of the following advantages:
- slow the total travel time for menstrual material across the tampon giving the tampon more time to absorb the menstrual material;
- reduce the likelihood of possible leakage before full saturation of the tampon;
- require less frequent replacement of tampons and lower the total cost of goods required per period cycle;
- conform to the rugae along the vaginal walls to prevent displacement during active movement;
- sustainable materials, and/or
- absorb clots and more viscous material.

In some configurations, the tampon may include a body (e.g., an elongate body) having an absorbent material and one or more flow paths that direct bodily fluid (e.g., menses) across the body. In some configurations, the flow path may be a single, continuous flow path. The body may include an insertion end and a removal end opposite the insertion end. A longitudinal axis of the body extends through the removal end and the insertion end. Optionally, the tampon may also include a removal thread or string extending from the removal end of the body. Each flow path may include a fully enclosed ring (e.g., an annular ring, waved ring, zig-zag ring, etc.) or a spiral with at least one complete turn around the longitudinal axis of the body. In either configuration, the flow path may be disposed within a single plane or extend along at least a partial length of the body. In either configuration, the flow path may extend along an outer surface of the body and/or internal of the body. In configurations having a spiral flow path, the spiral flow path may have a first free end at or near the insertion end of the body (e.g., within 5% or 10% of a length of the body from the insertion end) and a second free end at or near the removal end of the body (e.g., within 5% or 10% of a length of the body from the removal end). In configurations with a spiral flow path, successive turns of a spiral flow path may have a constant or different radius. The flow path may be molded, cut, compressed, or otherwise formed into the external surface of the body, or formed by a thread wrapped around or within the body. In some implementations, the body may include an absorbent material such as bamboo.

In one embodiment, the removal string is hypoallergenic and is designed to prevent or reduce irritation to surrounding tissue. The removal string is optional and may not be included in some embodiments. The string may be looped, compressed, or elongated, and may be designed for concealment, which may be particularly beneficial for certain athletic events (such as swimming). In some embodiments, the string is absorbent and is designed to absorb a portion of the menstrual flow. In some embodiments, the string is hydrophobic and/or is designed to be waterproof or non-absorbent. In other embodiments, the string is partially absorbent and partially non-absorbent and/or has variable regions of absorbency (e.g., along the string length).

In some embodiments, the tampon may include a body (e.g., an elongate body) one or more spiral recesses in an outer surface of the body. The body may include an insertion end and a removal end opposite the insertion end. A longitudinal axis of the body extends through the removal end and the insertion end. In some configurations, the insertion end of the body may be rounded or tapered such that the insertion end has a reduced diameter compared to the removal end. Optionally, the tampon may also include a removal thread or string extending from a removal end of the body, which may extend along a partial or entire length of the body. Each spiral recess may turn about the longitudinal axis of the body. For example, each spiral recess extends at least one complete turn around a circumference of the body. Each turn of the spiral recess may be angled closer to horizontal than the longitudinal axis of the body such that each turn of the spiral recess has a greater latitudinal component than longitudinal component. For example, each turn of the spiral recess may be angled between 45 degrees and 90 degrees (e.g., between 50 degrees and 80 degrees or between 65 degrees and 75 degrees) from the longitudinal axis. With the spiral turning about the longitudinal axis, the pitch of the spiral recess may be measured in the longitudinal direction. The pitch of each spiral recess may be between 5 mm and 15 mm or between 7.5 mm and 12:5 mm. The radius of curvature of each spiral recess may be less than or equal to 8 mm or less than or equal to 6 mm. An inner surface of each spiral recess may have a tapered or rounded profile. In some configurations, the spiral recess may be tapered in a radial direction such that an opening of the spiral recess at the outer surface of the body is wider than an apex of the spiral recess. In other configurations, the opening of the spiral recess may be narrower than an opposite side of the recess (e.g., the radially inward-most edge of the recess), for example with diverging internal surfaces or a rounded profile. In some configurations, the spiral recess may be concave in a radial direction. The body may include a rounded or sharp corner between the inner surface of the spiral recess and the outer surface of the body. Each spiral recess may be formed using a mold (e.g., compression mold), a thread, compressed, cut, or otherwise formed. In some configurations, the tampon may include a single, continuous spiral recess. The spiral recess may have a first free end at or near the insertion end of the body (e.g., within 5% or within 10% of a length from the insertion end) and a second free end at or near the removal end of the body (e.g., within 5% or within 10% of a length from the removal end). Optionally, the tampon may include a plurality of longitudinal recesses in the outer surface of the body. The plurality of longitudinal recesses may cross successive turns of the spiral recess. In some implementations, the body may include an absorbent material such as bamboo.

In some embodiments, the tampon may include a body (e.g., an elongate body) having one or more spirally wrapped threads that direct a flow of bodily fluid (e.g., menses) across the body. The body may include an insertion end and a removal end opposite the insertion end. A longitudinal axis of the body extends through the removal end and the insertion end. In some configurations, the insertion end of the body may be rounded or tapered such that the insertion end has a reduced diameter compared to the removal end. Optionally, the tampon may also include a removal thread or string extending from a removal end of the body, which may extend along at least a partial or entire length of the body. Each spirally wrapped thread includes at least one complete turn around a longitudinal axis of the body. Each spirally wrapped thread may extend along an outer surface of the body to form a recess in the outer surface of the body and/or extend internally within the body. Each spirally wrapped thread may be disposed within a single plane or spiral along at least a partial length of the body. For example, in some embodiments, each thread may be spirally wrapped within a single plane. In other embodiments, each thread may be spirally wrapped such that successive turns are longitudinally displaced from each other along a length of the body. In either configuration, successive turns of the spirally wrapped thread may have a constant or varying radius. For example, in some embodiments, each spirally wrapped thread may include a first radius of curvature and a second radius of curvature that is smaller than the first radius of curvature. In some configurations, the second radius of curvature may be closer to the removal end, but in other configurations, the first radius of curvature may be closer to the removal end. In some implementations, the body may include an absorbent material such as bamboo.

In some embodiments, methods of manufacturing a tampon include forming a body (e.g., an elongate body) of the tampon from an absorbent material. For example, a layer of the absorbent material may be formed into the body. The method may include rolling the layer of absorbent material to form the body. In some configurations, the layer of absorbent material may have parallel fibers. When the body is formed, the fibers may be oriented in a direction perpendicular to the longitudinal axis of the body. Optionally, a retrieval thread or string may be attached to the layer of absorbent material. A spiral flow path may be formed in an outer surface of the body such that the spiral flow path turns about a longitudinal axis of the body. In some methods, the spiral flow path may be formed by compressing the outer surface, for example by using a mold (e.g., a compression mold). In some methods, the spiral flow path may be formed by applying a thread around the outer surface of the body. In some methods, the spiral flow path may be cut or otherwise formed in the body. In this method, the thread may be bonded or otherwise attached to the outer surface of the body.

Any of the tampons described herein may be incorporated into a kit. In some embodiments, a kit may include a plurality of tampons. Each of the plurality of tampons may include a body (e.g., an elongate body) having an insertion end and a removal end opposite the insertion end. A longitudinal axis of the body extends through the insertion end and the removal end. Each of the plurality of tampons may include a flow path configured to direct menses across the body. The flow path may provide at least one complete turn about the longitudinal axis of the body. Each tampon may include a same type or different types of flow paths as described herein. Optionally, each of the plurality of tampons may include a removal thread or string extending from a removal end of the body. In some kits, the plurality of tampons includes at least two different sized tampons providing different levels of absorbency. The kit may include one or more menstrual pads, period underwear, and/or panty liners.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIGS. 6A-6C illustrate a tampon having a spiral flow path.

DETAILED DESCRIPTION

With the absorbent materials and/or flow paths outlined herein, tampons, according to some embodiments, exhibit higher comfort, performance, and sustainability. The tampons described herein, in one embodiment, reduce the likelihood of premature leakage before the absorbent material is fully saturated. The tampons according to several embodiments described herein are particularly advantageous because they offer reduced leakage before full saturation of the tampon to active women, including athletes, who do not have the ability to leave and check their tampon. This allows women to stay engaged and focused without worrying about leakage.

Figure 1:
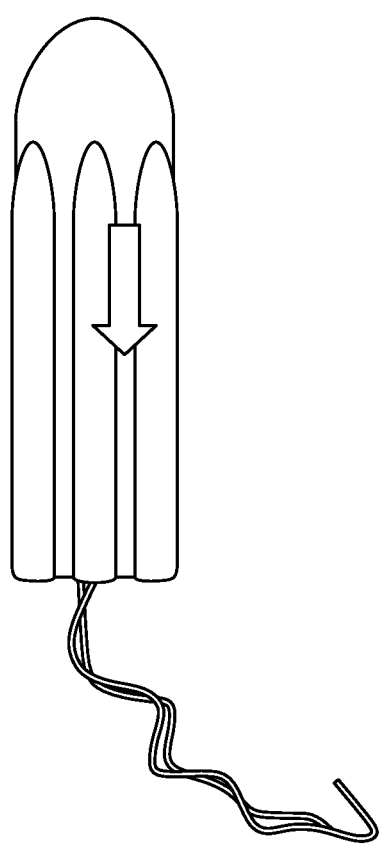
FIG. 1 illustrates a tampon with a longitudinal flow path to direct a flow of menses.
Figure 2:
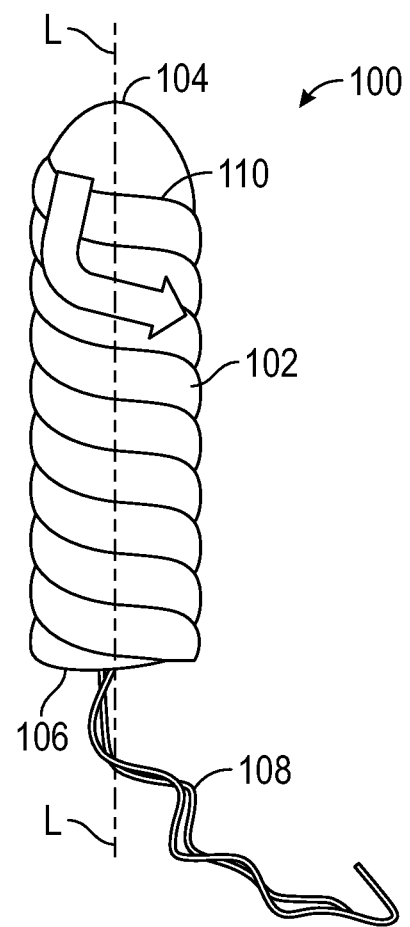
FIG. 2 illustrates a tampon with spiral flow path to direct a flow of menses.

FIG. 2 illustrates a tampon 100 having a body 102 with a first or insertion end 104 and a second or removal end 106. The body 102 may have an elongate shape, for example a generally cylindrical shape. The first end 104 of the elongate body 102 may be rounded and/or tapered to facilitate insertion of the tampon 100. The end face of the first end 104 may have a rounded or flat profile. The first end 104 of the elongate body 102 may have a reduced diameter compared to the second end 106 of the elongate body 102. The second end 106 of the elongate body 102 may include a flattened base. As illustrated, the elongate body 102 has a rounded cone portion and a cylindrical base portion, but in other configurations, the elongate body 102 may be entirely cylindrical.

The length of the elongate body 102, measured along a longitudinal axis L of the elongate body 102, may be greater than a width of the elongate body 102, measured along an axis perpendicular to the longitudinal axis L. For example, the length of the elongate body 102 may be at least three times or at least four times greater than the width of the elongate body 102. The length of the elongate body 102 can be less than or equal to about 7 cm, less than or equal to about 6 cm, or less than or equal to about 5 cm, for example between about 4 cm and about 6 cm. A width of the second end 106 of the elongate body 102 can be less than or equal to about 1.5 cm (e.g., 1.25-1.5 cm, 1.0-1.25 cm, 0.75-1.0 cm and numerical values in between), while a width of the first end 104 of the elongate body 104 can be less than or equal to about 1.0 cm (e.g., 0.75-1.0 cm, 0.5-0.75 cm, 0.25-0.5 cm and numerical values in between). A total mass of the elongate body 102 can be between about 1.5 g and about 2.5 g, for example between about 1.9 g and about 2.1 g.

The tampon 100 may also include a removal string 108 extending from the second end 106 of the elongate body 102. The removal string 108 facilitates removal of the elongate body 102 without tearing or breaking the tampon 100. The removal string 108 may extend through at least a portion of the elongate body 102. For example, as explained below with respect to FIG. 8A, the removal string 108 may extend along the entire length or substantially the entire length of the elongate body 102. The removal string 108 may be a single fiber or include a plurality of fibers braided together. The removal string 108 may include cotton, polyester, polypropylene, rayon, or a blended material including any of the aforementioned materials.

The elongate body 102 includes at least one flow path 110 configured to direct a flow of menses across the elongate body 102. The flow path 110 may at least partially direct a flow of menses in a latitudinal direction. The flow path 110 may be visually distinct from adjacent portions of the elongate body 102. As shown in FIG. 2, the elongate body 102 includes a single, continuous flow path 110 that directs a flow of menses along an external surface of the elongate body 102. However, as described in more detail below, the flow path 110 may direct a flow of menses internally through the elongate body 102 in addition to, or in alternative to, directing flow along the external surface of the elongate body 102. The flow path 110 extends at least one complete turn around a circumference or perimeter of the elongate body 102 or within the elongate body 102. The complete turn of the flow path 110 may include a fully enclosed ring or a 360 degree turn of a spiral. In a spiral configuration, the spiral may include a curve disposed in a single plane or a three-dimensional curve that extends longitudinally along an axis.

The elongate body 102 includes an absorbent material that may have liquid wicking performance. In some configurations, the elongate body 102 may include a liquid permeable cover layer having the same or a different material from the core material of the elongate body 102. The absorbent material may include cotton, organic cotton, rayon, viscose, lyocell, bamboo, foam, or a blend including any of the aforementioned materials. For example, the absorbent material may be a cotton-bamboo blend such as a 50-50 cotton-bamboo blend. With a cotton-bamboo blend, the bamboo component provides absorbency and antibacterial properties, while the cotton acts to "wick" a saturated product. Bamboo is also a sustainable material. As another example, the absorbent material may be a viscose blend such as a combination of Kelheim Galaxy® fiber and Kelheim Danufil® fiber. The viscose blend may include more Galaxy® fiber than Danufil® fiber, for example 70% Kelheim Galaxy® fiber and 30% Kelheim Danufil® fiber. The absorbent material may be a blend between viscose fibers and cotton.

Figure 3:
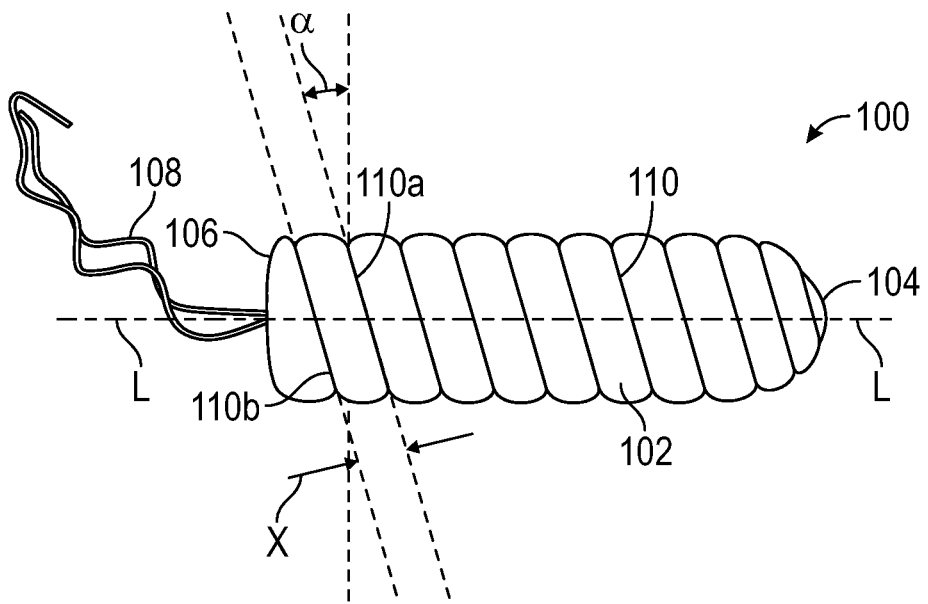
FIG. 3 illustrates a tampon with a right-handed spiral flow path.
Figure 4:
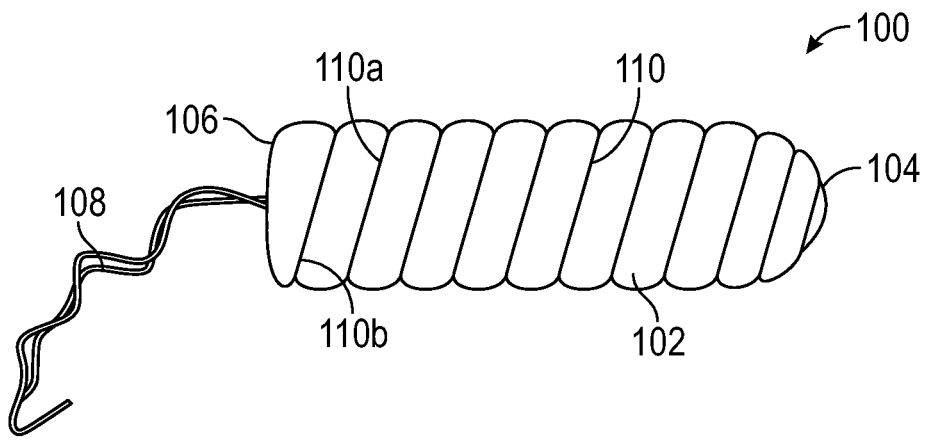
FIG. 4 illustrates a tampon with a left-handed spiral flow path.

As shown in FIG. 3, the flow path 110 may be a spiral flow path extending across a length of the elongate body 102. As illustrated, the flow path 110 is a right-handed spiral, but the flow path 110 may be a left-handed spiral (see FIG. 4). The flow path 110 begins at or near the first end 104 of the elongate body 102, for example within the rounded or tapered portion of the elongate body 102, and terminates at or near the second end 106 of the elongate body 102. The spiral flow path 110 begins with a free end and terminates at a free end. The spiral flow path 110 may be a single, continuous flow path along an external surface of the elongate body 102 with a single termination point at or near the second end 106 of the elongate body 102. The spiral flow path 110 increases the length of the flow path to provide a slower flow path for menses compared to a longitudinal flow path. The lengthened flow path gives the elongate body more time to absorb the menses and therefore reduces leakage. For a similar sized tampon having the same absorbent material, the spiral flow path increases total time to possible leakage by at least 10% to 20%.

Each turn of spiral flow path 110 rotates about the longitudinal axis L of the elongate body, such that each turn of the spiral flow path 110 is closer to latitudinal than longitudinal when viewed with insertion end 104 vertically above the removal end 102. At least one turn 110a, 110b of the spiral flow path 110 may be disposed at an angle α from horizontal where horizontal is perpendicular to the longitudinal axis L. The angle α can be less than or equal to about 60 degrees, less than or equal to about 40 degrees, or less than or equal to about 20 degrees. Each turn 110a, 110b of the spiral flow path may be disposed at the same angle α or the angles α may vary. Each turn 110a, 100b may be disposed at an angle that is at least about 45 degrees and/or less than or equal to about 90 degrees from the longitudinal axis L, for example between about 45 degrees and about 75 degrees, between about 50 degrees and about 80 degrees, or between about 60 degrees and about 90 degrees. The pitch x between successive turns 110a, 110b of the spiral flow path 110 may be less than or equal to about 20 mm, less than or equal to about 10 mm, or less than or equal to about 5 mm. In some configurations, a distance between any two points disposed 360 degrees apart along the spiral flow path 110 may be constant.

The spiral flow path 110 continually travels in a single or longitudinal direction from a single starting point at or near the insertion end 104 to a single terminating point at or near the removal end 106. When moving from the starting point to the terminating point, any selected location along the spiral flow path is closer to the removal end 106 of the elongate body 102 than any previous location between the starting point and the selected location. As the spiral flow path 110 travels toward the removal end 106, the spiral flow path 110 never turns back toward insertion end 104. This enables the menses to flow in a direction that is closer to latitudinal than longitudinal at any given segment of the flow path 110.

Figure 5:
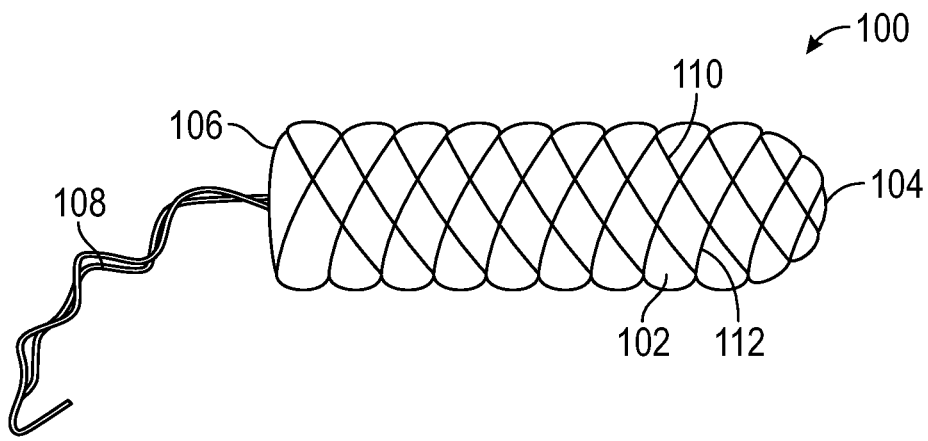
FIG. 5 illustrates a tampon with a double spiral flow path.

As explained above, the elongate body 102 may include more than one flow path. For example, as shown in FIG. 5, the elongate body 102 may include a first, right-handed spiral flow path 110 twisted together with a second, left-handed spiral flow path 112.

FIGS. 6A-6C illustrate a tampon 200 having an elongate body 202 with a first or insertion end 204 and a second or removal end 206. The elongate body 202 may include any of the absorbent materials described above. Although not shown, the tampon 200 may include a removal string extending from the removal end 206 of the elongate body 202. The tampon 200 may include any of the features described above with respect to the tampon 100.

The tampon 200 includes a spiral flow path 210 configured to direct a flow of menses along an outer surface of the elongate body 202. The spiral flow path 210 may be a groove, channel, or indentation that provides a recess in the outer surface of the elongate body 202. The spiral flow path 210 begins at or near the first end 204 of the elongate body 202 (see FIG. 6B) and terminates at or near the second end 206 of the elongate body 202 (see FIG. 6A). The spiral flow path 210 may provide a single, continuous recess terminating at a single location at the second end 206 of the elongate body 202. As shown in FIGS. 6A and 6B, there is only one spiral flow path 210 without any additional grooves, channels, indentations, or other flow paths.

When the tampon 200 sits within the vaginal cavity, the spiral flow path 210 enables the tampon to conform to the rugae along the vaginal walls to reduce the likelihood of displacement. For a 2.0 g tampon having a spiral flow path 210, the tampon 200 exhibits a tampon absorption rate of at least 9 g and has super absorbency rating according to the Syngyna test outlined by the Food and Drug Administration under 21 C.F.R. § 801.430 ("User labeling for menstrual tampons"). This means the tampon absorbed at least 9 g of fluid prior to the first drop of fluid leakage. Tampons having a spiral flow path 210 absorb at least about 3.75 grams of fluid per gram of dry absorbent material in the tampon, at least about 4.0 grams of fluid per gram of dry absorbent material in the tampon, or at least 4.25 grams of fluid per gram of dry absorbent material in the tampon. For example, tampons having the spiral flow path may absorb between about 4.0 grams to about 4.5 grams of fluid per gram of dry absorbent material according to the Syngyna test.

The spiral flow path 210 extends at least one complete turn around a circumference or perimeter of the elongate body 202. For example, the spiral flow path 210 may include at least about two complete turns (e.g., at least about three complete turns) and/or less than or equal to about ten complete turns, for example between about two complete turns and about four complete turns or between about three complete turns and about five complete turns. As shown in FIGS. 6A and 6B, the spiral flow path 210 extends about four complete turns around the circumference of the elongate body 202. However, the spiral flow path 210 may include a fewer or greater number of turns depending on the pitch x between successive turns of the spiral flow path 210. The pitch x may be less than or equal to about 20 mm, less than or equal to about 10 mm, or less than or equal to about 5 mm (see FIG. 6C). In some embodiments, the pitch x is between about 7.5 mm and about 10 mm or between about 5 mm and about 7.5 mm. The pitch x may be at least about 10% of a length of the elongate body 202 and/or less than or equal to about 40% of the length of the elongate body 202. In some embodiment, the pitch x is between about 10% and about 15% of a length of the elongate body 202 or between about 15% and about 20% of a length of the elongate body 202. The pitch x may be constant or varied along the length of the spiral flow path 210.

A depth d of the spiral flow path 210, measured from an outer surface of the elongate body 202 to an apex of the spiral flow path 210, is sufficiently shallow to maintain the integrity of the elongate body 202. For example, the depth d may be less than or equal to about 5 mm, for example less than or equal to about 3 mm. The depth d of the recess may be less than or equal to about 40% (e.g., 30%-40%, 20%-30%, 15%-25% and numerical values in between) of a width of the elongate body 202, for example less than or equal to about 25% (e.g., 20%-25%, 15%-20%, 10%-15% and numerical values in between) of a width of the elongate body 202. The depth d of the recess may be constant or varied along the length of the spiral flow path 210.

The width w at an opening of the spiral flow path 210 may be less than or equal to about 5 mm, for example less than or equal to about 2 mm. In some embodiments, the width is between about 1.5 mm and about 2.5 mm (e.g., 1.5-2.0 mm, 1.75-2.25 mm and numerical values within those ranges). The width w may be less than or equal to about 15% of the length of the elongate body 202, for example less than or equal to about 10% of the length of the elongate body 202 (e.g., 10% to 15%, 7.5% to 12.5%, 5% to 10% and numerical values within those ranges). The width w at the opening of the spiral flow path 210 may be constant or varied along the length of the spiral flow path 210.

The spiral flow path 210 includes an inner surface 214. As illustrated, the spiral flow path 210 includes two inner surfaces 214 tapered toward an apex of the recess. However, in other configurations, the width w at the opening of the spiral flow path 210 may be the same or narrower than the opposite side of the spiral recess (e.g., at the most radially inward edge of the spiral flow path 210). For example, the two inner surfaces 214 may be parallel or diverge from each other. In other configurations, the inner surface 214 of the flow path 210 may be rounded such that the inner surface 214 has a concave profile when viewed in cross-section. The radius of curvature at the open side of the flow path 210 may be greater than, less than, or the same as the radius of curvature at the innermost edge of the flow path 210. The inner surface 214 and the outer surface of the elongate body 202 may form a sharp edge or a rounded edge. An inner surface 214 of the spiral flow path 210 may be disposed at an angle α from horizontal, measured perpendicular to the longitudinal axis L of the elongate body 202 (see FIG. 6C). The angle α may be less than or equal to about 40 degrees, less than or equal to about 30 degrees, less than or equal to about 20 degrees, less than or equal to about 15 degrees, or less than or equal to about 10 degrees. In some embodiments, the angle α is between 30 degrees and about 40 degrees, between about 25 degrees and about 35 degrees, between about 15 degrees and about 25 degrees and numerical values within those ranges. The angle α may be constant or varied along the length of the spiral flow path 210. Each turn of the spiral flow path 210 may be disposed at an angle that is between about 45 degrees and about 90 degrees from the longitudinal axis L, for example between about 45 degrees and about 75 degrees, between about 50 degrees and about 80 degrees, or between about 60 degrees and about 90 degrees.

Each turn of the spiral flow path 210 may have a radius of curvature of less than or equal to about 10 mm, less than or equal to about 8 mm, or less than or equal to about 6 mm (e.g., 2-6 mm, 3-5 mm, 4-8 mm and numerical values within those ranges). The radius of curvature may be constant or varied along the length of the spiral flow path 210. The entire spiral flow path 210 may have a curvature without any corners or apexes forming a point.

With reference to FIGS. 7A-7D, another tampon 300 is shown. The tampon 300 resembles or is identical to the tampon 200 except as described below.

In addition to the spiral flow path 310, the elongate body 302 may have one or more secondary flow paths 316. For example, the elongate body 302 may include a plurality of secondary flow paths 316 spaced apart from each other around a circumference of the elongate body 302. Each secondary flow path 316 may cross successive turns of the spiral flow path 310. Each secondary flow path 316 may extend in a generally longitudinal direction or at least closer to the longitudinal direction than the turns of the spiral flow path 316. The secondary flow paths 316 facilitate tampon expansion, which can facilitate more even absorption. An under-expanded tampon may lead to premature leakage.

The secondary flow paths 316 may be grooves, channels, or indentations that form a recess in an outer surface of the elongate body 302. Each secondary flow path 316 may begin at or near the first end 304 of the elongate body 302 and terminate at or near the second end 306 of the elongate body 302. Each secondary flow path 316 may be circumferentially spaced apart by at least about 2 mm, at least about 4 mm, or at least about 6 mm (e.g. 2-4 mm, 3-5 mm, 4-6 mm and numerical values within those ranges). The space between successive secondary flow paths 316 may be constant or varied around the circumference of the elongate body 302.

A depth d' of the secondary flow path 316, measured from the outer surface of the elongate body 302 to an apex of the secondary flow path 316, may be the same or different from the depth d of the spiral flow path 310. For example, the depth d' may be less than or equal to about 5 mm or less than or equal to about 3 mm (e.g., 2-4 mm, 2.5-4.5 mm, 3-5 mm and numerical values within those ranges). The depth d' of the secondary flow path 316 may be less than or equal to about 40% of a width of the elongate body 302, for example less than or equal to about 25% of a width of the elongate body 302 (e.g., 15% to 25%, 20% to 30%, 25% to 35% and numerical values within those ranges). The depth d of the secondary flow path 316 may be constant or varied along a length of the spiral flow path 310.

The width w' at an opening of the secondary flow path 316 may be the same or different from the width w of the spiral flow path 310. For example, the width w' may be less than or equal to about 5 mm (e.g., 3-5 mm, 1-3 mm, 0.5-2 mm and numerical values within those ranges) or less than or equal to about 2 mm. The width w' may be less than or equal to about 10% (e.g., 8-10%, 6-8%, 3-6%, 1-5%, and numerical values within those ranges) of a circumference of the elongate body 302, for example less than or equal to about 5% of a circumference of the elongate body 302. The width w' at the opening of the secondary flow path 316 may be constant or varied along the length of the spiral flow path 310.

Figure 7A:
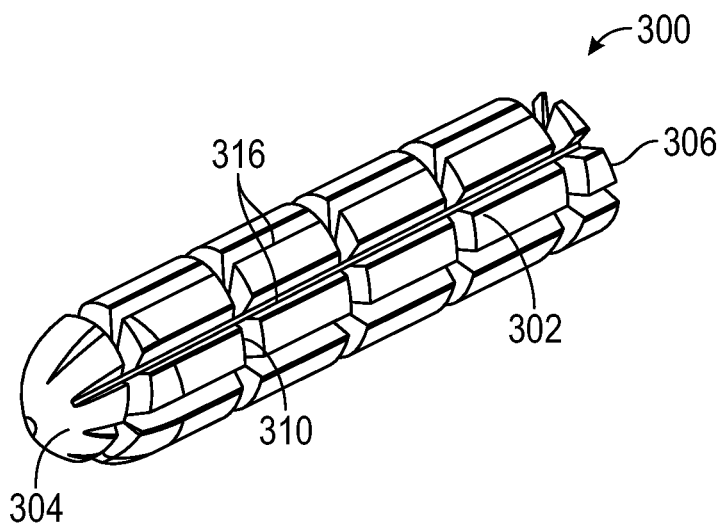
FIGS. 7A-7D illustrate a tampon having a spiral flow path and secondary flow paths crossing the spiral flow path.
Figure 7B:
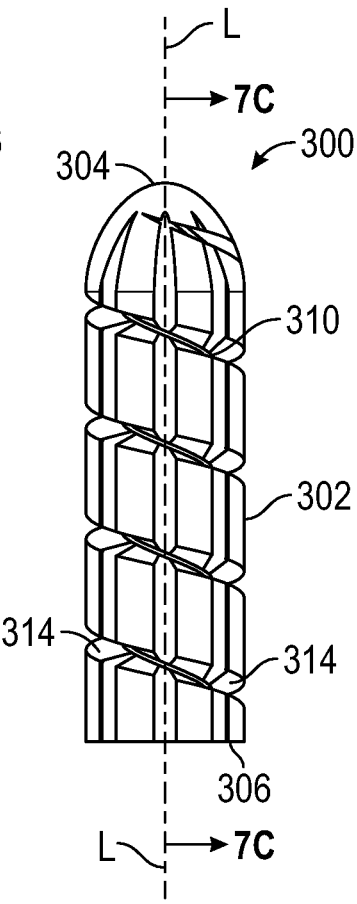
Figure 7C:
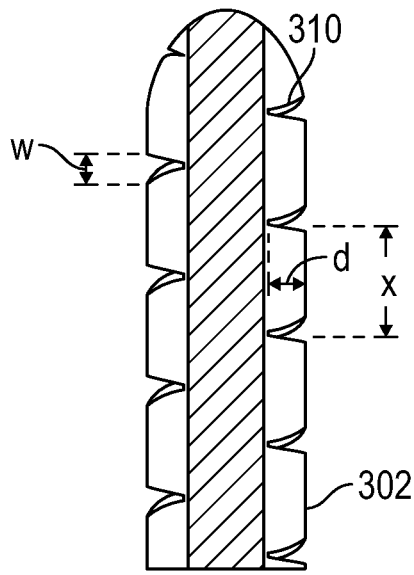
Figure 7D:
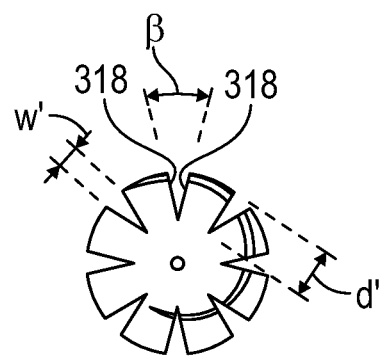

Each secondary flow path 316 may be defined by adjacent inner surfaces 318 (see FIG. 7D). An angle β between the adjacent inner surfaces 318 may be less than or equal to about 40 degrees, less than or equal to about 30 degrees, less than or equal to about 20 degrees, less than or equal to about 15 degrees, or less than or equal to about 10 degrees. For example, the angle β may be between about 20 degrees and 25 degrees, between about 17.5 and 22.5 degrees, between about 15 degrees and 20 degrees and numerical values within those ranges. The angle β may be constant or varied along the length of the spiral flow path 310.

Figure 8A:
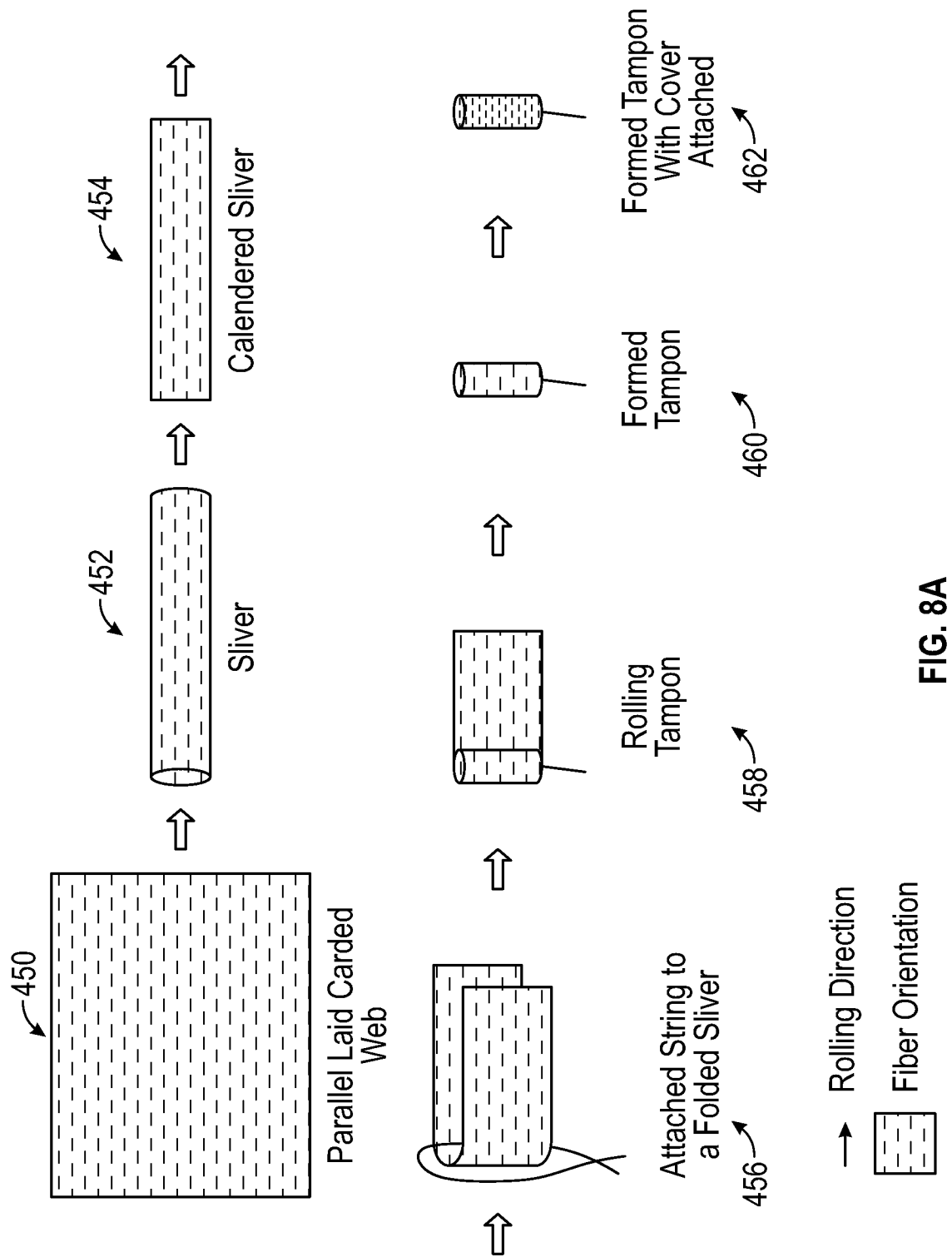
FIG. 8A illustrates a method of manufacturing a tampon.

FIG. 8A illustrates a method of manufacturing the tampons 100, 200, 300. Fibers of any material described herein can be carded into a web, for example a parallel laid web in which the fibers are oriented parallel to each other (step 450). The basis weight of the web may be at least about 20 g/m$^2$ and/or less than or equal to about 50 g/m$^2$, for example between about 20 g/m$^2$ and about 40 g/m$^2$ (e.g., 20-30 g/m$^2$, 25-35 g/m$^2$, 30-40 g/m$^2$ and numerical values within those ranges). After the web is formed, the web is passed through a can coiler sliver former (step 452). The sliver may then be densified using a cold calendaring process (step 454). A single tampon may include about 1.5 g to about 2.5 g of the calendared sliver, for example between about 1.9 g and 2.1 g. The calendared sliver may be folded so that a removal string may be applied to the sliver (step 456). The folded sliver may be rolled, for example in a swiss roll design, in the same direction as the orientation of the fibers (step 458) to form the tampon shown in step 460. The horizontally oriented fibers slow fluid flow in the longitudinal direction. In some embodiments, the tampon may be rolled such that a central core of the elongate body is more dense than an outer portion of the elongate body. In other embodiments, the density of the elongate body may be constant throughout.

Optionally, a cover layer may be provided over the elongate body (step 462). The cover layer may be a layer of nonwoven material, which may be the same or different from the core material. The cover layer may be a layer of carded, nonwoven material or a spunbound material. The cover layer may have a lower basis weight than the core. For example, the basis weight of the cover layer may be less than or equal to about 20 g/m$^2$ or less than or equal to about 15 g/m$^2$ (e.g., 7.5-12.5 g/m$^2$, 10-15 g/m$^2$, 12.5-17.5 g/m$^2$ and numerical values within those ranges). The cover layer may be bonded to the absorbent core of the elongate body, for example thermally bonded using a hot knife.

Although a particular manufacturing method is described with respect to FIG. 8A, the tampons described herein may be manufactured using other methods. For example, after the elongate body is formed, the elongate body may be twisted to form the external spiral flow path having at least one complete turn.

Figure 8B:
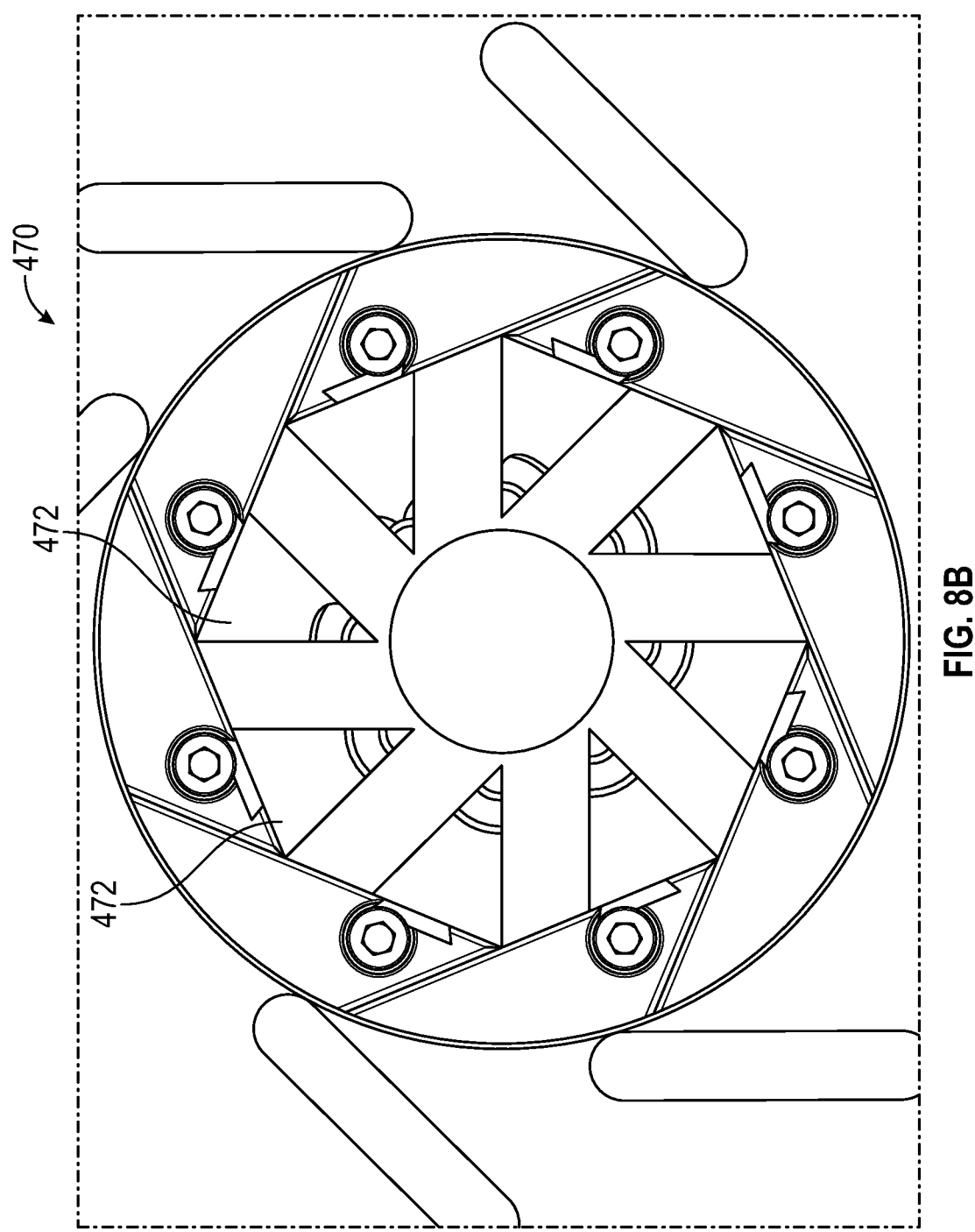
FIGS. 8B and 8C illustrate a mold that may be used to manufacture a tampon.
Figure 8C:
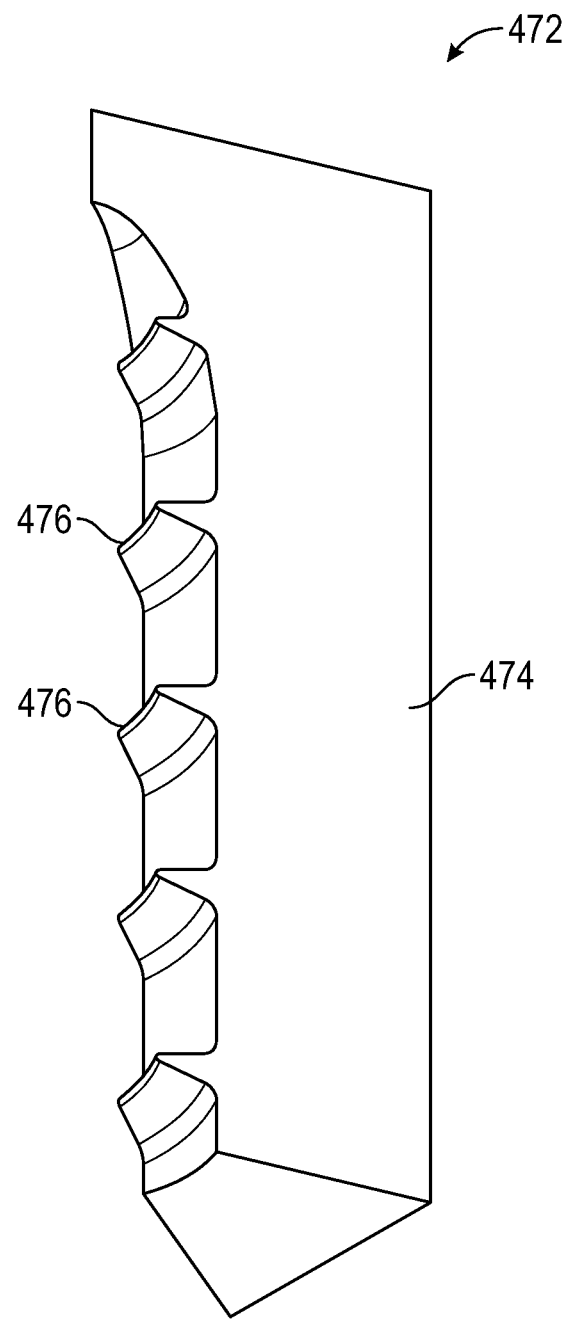

As described above, the elongate body may include one or more flow paths in the outer surface of the elongate body. The flow paths may be molded into the outer surface of the elongate body, for example using a radial compression mold. The mold forms grooves, channels, or indentations that form recesses in the outer surface of the elongate body. The localized compression along the flow path adds more surface area and friction as fluid meets the flow path, thereby slowing the rate of fluid flow in the longitudinal direction. The slower fluid flow provides more time for the elongate body to absorb fluid, promotes full saturation of the tampon, and delays possible leakage. FIG. 8B provides an example of a compression mold 470 including one or more mold segments 472 disposed circumferentially around the mold 470. Each mold segment 472 may be tapered toward a center of the mold 470. Each segment 472 may span between 30 degrees and 180 degrees of the elongate body, for example between 45 degrees and 90 degrees of the elongate body. In use, the formed tampon may be disposed at the center of the one or more mold segments 472. As the one or more mold segments 472 move radially inward toward the elongate body of the tampon, the flow path is formed in the outer surface of the elongate body. This compression process may be manual or automated. FIG. 8C illustrates a single mold segment 472. As illustrated, the mold segment 472 includes a body portion 474 and one or more projections 476 projecting from the body portion 474. The one or more projections 476 form a negative of at least a partial segment of the flow path to be created on the elongate body. Thus, the projections 476 may have dimensions similar to those described with respect to the flow path 210 above. When all the mold segments 472 are combined, there is a complete negative of the flow path to be created on the elongate body.

Figure 9:
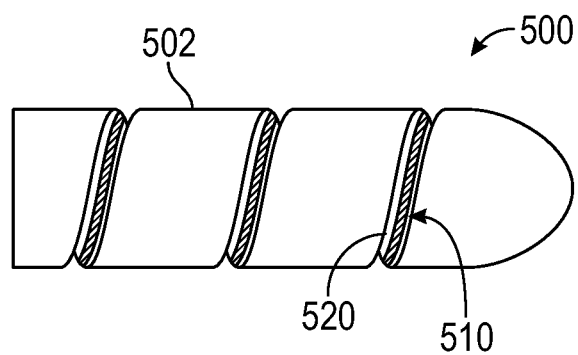
FIG. 9 illustrates another tampon having a spiral flow path.

FIG. 9 illustrates a tampon 500 that resembles or is identical to tampons 200, 300 except as described below. As shown in FIG. 9, the elongate body 502 includes a spiral flow path 510 similar to the spiral flow paths 210, 310. In this configuration, the elongate body 502 includes a thread 520 extending around the elongate body 502 to form the spiral flow path 510. The thread 520 compresses the outer surface of the elongate body 502 to form a spiral recess in the outer surface of the elongate body 502. The thread 520 may include a same or different material from the absorbent material of the elongate body 502 or the removal string. For example, the thread 520 may include cotton, polyester, polypropylene, or a blend including any of the aforementioned materials. A hydrophilic or hydrophobic coating may be applied to the thread 520. The thread 520 may be a single fiber or braided from multiple fibers. The thread 520 may be a filament, ribbon, wire, or any other string-like structure.

The elongate body 502 of the tampon 500 may be formed using the method shown in FIG. 8A. After the elongate body 502 is formed, the thread 520 may be fastened around the elongate body 502 to compress the outer surface of the elongate body 502 and form the spiral flow path 510. The thread 520 may be woven into the spiral orientation, for example using a rotating tool. The thread 520 may be chemically, thermally, or mechanically bonded to the outer surface of the elongate body 502. At least the ends of the thread 520 may be bonded to the elongate body 502. In some methods, the thread 520 may be bonded to the elongate body 502 along an entire length of the thread 520.

Figure 10:
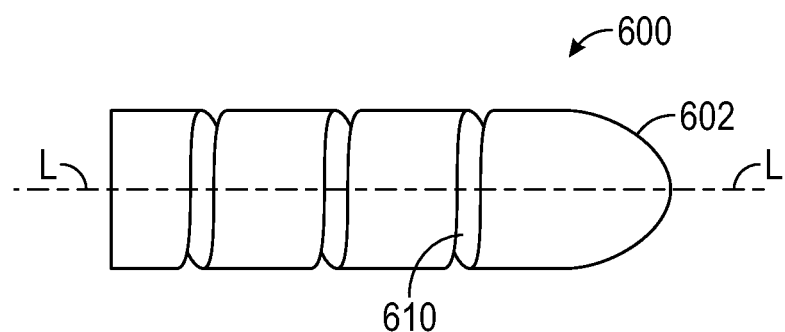
FIG. 10 illustrates a tampon having latitudinal flow paths.

FIG. 10 illustrates a tampon 600 that may include any features of the above-described tampons. The tampon 600 includes an elongate body 602 and one or more flow paths 610. Each of the one or more flow paths 610 may be a groove, channel, or indentation that forms a recess in an outer surface of the elongate body 602. Unlike the spiral configurations described above, each flow path 610 may form a fully enclosed ring, such as an annular ring disposed in a single plane. For example, as shown in FIG. 10, each flow path 610 may be disposed in a single plane that is perpendicular to the longitudinal axis L of the elongate body 602. However, in other configurations, each flow path 610 may be disposed at an oblique angle relative to the longitudinal axis L, for example at an angle that is less than or equal to about 60 degrees, less than or equal to about 40 degrees, or less than or equal to about 20 degrees relative to the longitudinal axis L (e.g., 50-60 degrees, 45-55 degrees, 40-50 degrees, 35-45 degrees and numerical values within those ranges). In some configurations, the flow path 610 may be disposed at an angle that is between about 45 degrees and about 90 degrees from the longitudinal axis L, for example between about 45 degrees and about 75 degrees, between about 50 degrees and about 80 degrees, or between about 60 degrees and about 90 degrees.

The elongate body 602 may include at least two flow paths 610 and/or less than or equal to ten flow paths 610, for example between three flow paths 610 and five flow paths 610. However, the elongate body 602 may include a fewer or greater number of flow paths 610 depending on the distance between successive flow paths 610. Successive flow paths 610 may be separated by a distance of less than or equal to about 20 mm, less than or equal to about 10 mm, or less than or equal to about 5 mm. In some embodiments, the distance is between about 7.5 mm and 10 mm or between about 5 mm and about 7.5 mm. The distance between successive flow paths 610 may be at least about 10% of a length of the elongate body 602 and/or less than or equal to about 40% of a length of the elongate body 602. In some embodiment, the distance is between about 10% and 15% of a length of the elongate body 602 or between about 15% and about 20% of a length of the elongate body 602. The distance between successive flow paths 610 may be constant or varied along a length of the elongate body 602.

Figure 11:
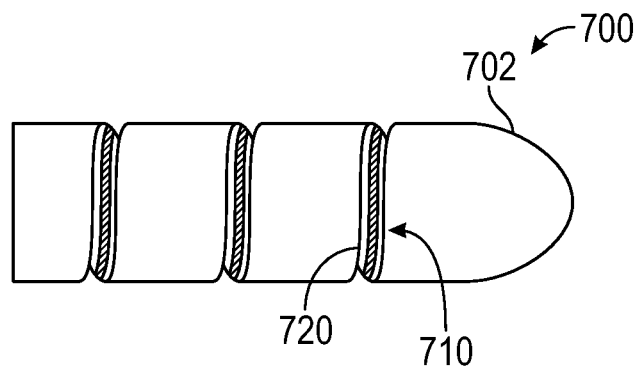
FIG. 11 illustrates another tampon having latitudinal flow paths.

FIG. 11 illustrates a tampon 700 that resembles or is identical to the tampon 600 except as described below. As shown in FIG. 11, the elongate body 702 includes a plurality of latitudinal flow paths 710 similar to the flow paths 610. In this configuration, the elongate body 702 includes a plurality of threads 720 extending around the elongate body 702 to form the one or more flow paths 710. The plurality of threads 720 compress the outer surface of the elongate body 702 to form the recessed flow paths 710.

For a 2.0 g tampon having the latitudinal flow paths 610, 710, the tampons 600, 700 exhibit a tampon absorption rate of at least 9 g and has super absorbency rating according to the Syngyna test. This means the tampon absorb at least 9 g of fluid prior to the first drop of fluid leakage. Tampons 600, 700 having a plurality of latitudinal flow paths 610, 710 absorb at least about 3.75 grams of fluid per gram of dry absorbent material in the tampon or at least about 4.0 grams of fluid per gram of dry absorbent material in the tampon. For example, tampons 600, 700 having a plurality of latitudinal flow paths 610, 710 may absorb between about 3.75 grams and about 4.0 grams or between about 4.0 grams and about 4.25 grams of fluid per gram of dry absorbent material according to the Syngyna test. For a similar sized tampon having the same absorbent material, the latitudinal flow paths 610, 710 increase total time to possible leakage by at least 5% to 35%.

As mentioned above, in addition, or in alternative to, the one or more flow paths disposed in the outer surface of the elongate body, the tampon may include one or more flow paths disposed within or internal of the elongate body to direct a flow of menses through the elongate body. The internal flow paths are not visible from an exterior of the tampon. The internal flow paths lengthen the total flow path, thus providing more time for the elongate body to absorb the menses and reducing the likelihood of leakage.

Figure 12A:
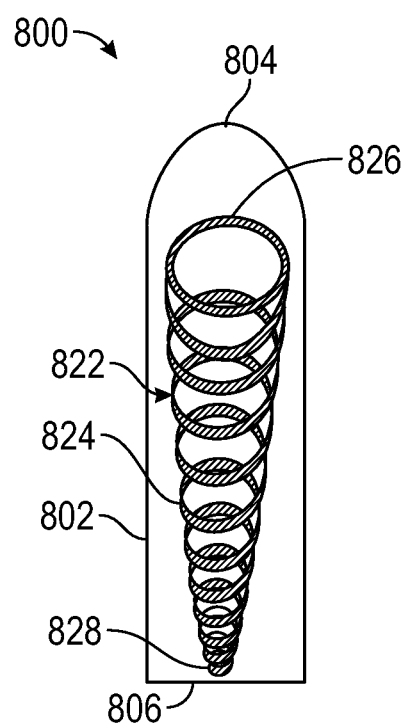
FIGS. 12A and 12B illustrate a tampon having an internal spiral flow path.

For example, as shown in FIG. 12A, the tampon 800 includes an internal flow path 822 positioned within the elongate body 802. The internal flow path 822 may provide a single, continuous spiral along at least a partial length or substantially the entire length of the elongate body 802. The internal flow path 822 includes a first end 826 positioned at or near the first end 804 of the elongate body 802 and a second end 828 that terminates at or near the second end 806 of the elongate body 802. As shown in FIG. 12A, there is only one internal flow path 822 without any additional internal flow paths.

The internal flow path 822 may include any of the features described above with respect to the spiral flow path 210. The internal flow path 822 extends at least one complete turn within the elongate body 802. Successive turns of the internal flow path 822 may have the same or different radius. As shown in FIG. 12A, the radius of the turns varies along a length of the internal flow path 822. A first radius of a turn at the first end 826 of the internal flow path 822 may be greater than a second radius of a turn at the second end 828 of the internal flow path 822.

The internal flow path 822 may be formed by a thread 824 extending through the elongate body 802. The thread 824 may include any of the properties of the thread 520 described above with respect to the tampon 500. The thread 824 may be continuous with or separate from the removal string 808.

Figure 12B:
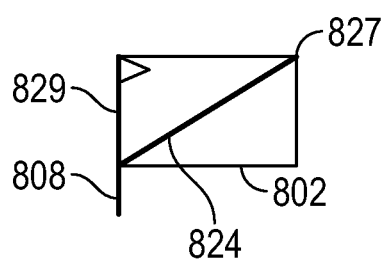

The elongate body 802 may be formed using a similar method to that shown in FIG. 8A. However, after the removal string is provided (see step 456), the thread 824 is provided to a surface of the sliver that will be internal of the elongate body 802. As shown in FIG. 12B, a single thread 824 is positioned diagonally across the folded sliver. The thread 824 may be bonded to the folded sliver or freely positioned on the folded sliver. The thread 824 may extend from a first location at or near a first corner 829, formed by the folded edge of the sliver and the edge that will form the second end 806 of the elongate body 802, toward a second location at or near a second corner 827, formed by the free edges of the sliver and the edge that will form the first end 804 of the elongate body 802. After the thread 824 is provided, the folded sliver may be rolled in the direction of the arrow, similar to step 458 of FIG. 8A.

Figure 13A:
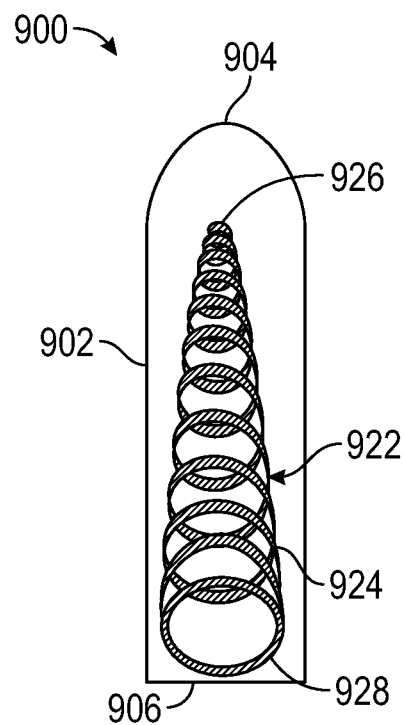
FIGS. 13A and 13B illustrate another tampon having an internal spiral flow path.

FIG. 13A illustrates a tampon 900 that resembles or is identical to the tampon 800 except as described below. As shown in FIG. 13A, the internal flow path 922 includes a first end 926 positioned at or near the first end 904 of the elongate body 902 and a second end 928 positioned at or near the second end 906 of the elongate body 902. A first radius of a turn at the first end 926 of the internal flow path 922 may be smaller than a second radius of a turn at the second end 928 of the internal flow path 922.

Figure 13B:
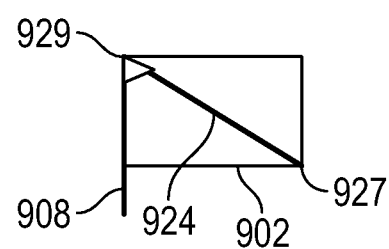

The tampon 900 may be formed using the same method described above with respect to the tampon 800 except that the thread 924 is applied to the folded sliver in the opposite direction. As shown in FIG. 13B, a single thread 924 is positioned diagonally across the folded sliver. The thread 924 may extend from a first location at or near a first corner 929, formed by the folded edge of the sliver and the edge that will form the first end 904 of the elongate body 902, toward a second location at or near a second corner 927, formed by the free edges of the sliver and the edge that will form the second end 906 of the elongate body 902. The thread 924 may be continuous with or separate from the removal string 908.

For a 2.0 g tampon having the internal flow path 822, 922, the tampon 800, 900 exhibits a tampon absorption rate of at least 8.5 g, or at least 9.0 g, according to the Syngyna test. Tampons 800, 900 having the internal flow path 822, 922 absorb at least about 3.75 grams of fluid per gram of dry absorbent material in the tampon or at least about 4.0 grams of fluid per gram of dry absorbent material in the tampon. For example, tampons 800, 900 having an internal flow path 822, 922 may absorb between about 3.75 grams and about 4.0 grams or between about 4.0 grams and about 4.25 grams of fluid per gram of dry absorbent material according to the Syngyna test. For a similar sized tampon having the same absorbent material, the internal flow path 822, 922 increases total time to possible leakage by at least 5% to 25%.

Figure 14A:
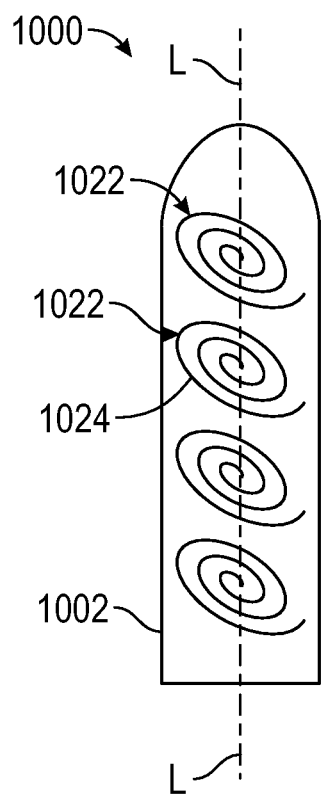
FIGS. 14A and 14B illustrate a tampon having a plurality of internal spiral flow paths.
Figure 14B:
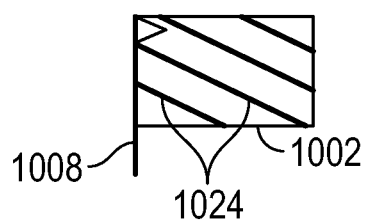
Figure 15B:
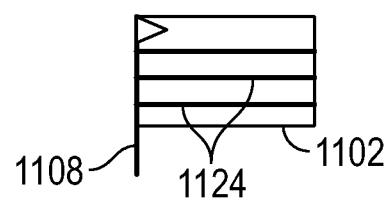

FIGS. 14A and 14B illustrate a tampon 1000 with a different internal flow path configuration. As shown in FIG. 14A, the tampon 1000 includes an elongate body 1002 with one or more internal flow paths 1022 positioned within the elongate body 1002.

Each flow path 1022 may be disposed within a single plane and at an oblique angle relative to a longitudinal axis L of elongate body 1002. As shown in FIG. 14A, the elongate body 1002 includes a plurality of internal flow paths 1022 longitudinally spaced apart along a length of the elongate body 1002. For example, the elongate body 1002 may include at least two internal flow paths 1022 and/or less than or equal to ten internal flow paths 1022, for example between three internal flow paths 1022 and five internal flow paths 1022. Successive internal flow paths 1022 may be separated by a distance that is less than or equal to about 30 mm, less than or equal to about 20 mm, less than or equal to about 10 mm, or less than or equal to about 5 mm. In some embodiments, the distance is between about 7.5 mm and about 10 mm or between about 5 mm and about 7.5 mm. The distance between successive internal flow paths 1022 may be at least about 10% of a length of the elongate body 1002 and/or less than or equal to about 40% of a length of the elongate body 202. In some embodiment, the distance is between about 10% and about 15% of a length of the elongate body 1002 or between about 15% and about 20% of a length of the elongate body 1002. The distance between successive internal flow paths 1022 may be constant or varied along a length of the elongate body 1002.

Each internal flow path 1022 may be disposed at a same or different angle relative to the longitudinal axis L of the elongate body 1022. For example, each internal flow path 1022 may be disposed relative to the longitudinal axis L at an angle θ that is less than or equal to about 60 degrees, for example between about 20 degrees and about 45 degrees (e.g., 20-30 degrees, 25-35 degrees, 30-40 degrees and numerical values within those ranges). Successive flow paths 1022 may be parallel to each other.

Each of the internal flow paths 1022 may be formed by a thread 1024 spiraling around a single point within the elongate body 1002. The spiraling thread includes at least one complete turn. The threads 1024 may include any of the properties of the thread 520 described above with respect to the tampon 500.

The elongate body 1002 may be formed using a similar method to that shown in FIG. 8A. However, after the removal string is provided (see step 456) one or more threads 1024 are provided to, a surface of the sliver that will be internal of the elongate body 1002. As shown in FIG. 14B, a plurality of threads 1024 are positioned diagonally across the folded sliver and parallel to each other. Each thread 1024 begins at a first location closer to the edge of the sliver that will form the first end 1004 of the elongate body 1002 than the second end 1006 of the elongate body 1002' and terminates at a second location closer to the edge of the sliver that will form the second end 1006 of the elongate body 1002 than the first end 1004 of the elongate body 1002. The threads 1024 are provided at an angle that is dependent on the desired angle θ of the flow path 1022 relative to the longitudinal axis L of the elongate body 1002. The threads 1024 may be bonded to the folded sliver or freely positioned on the folded sliver. After the threads 1024 are provided, the folded sliver may be rolled in the direction of the arrow, similar to step 458 of FIG. 8A.

Although not shown, the flow paths 1022 may be angled in the opposite direction. In the opposite configuration, each thread 1024 begins at a first location closer to the edge of the sliver that will form the second end 1006 of the elongate body 1002 than the first end 1004 of the elongate body 1002 and terminates at a second location closer to the edge of the sliver that will form the first end 1004 of the elongate body 1002 than the second end 1006 of the elongate body 1002.

Figure 15A:
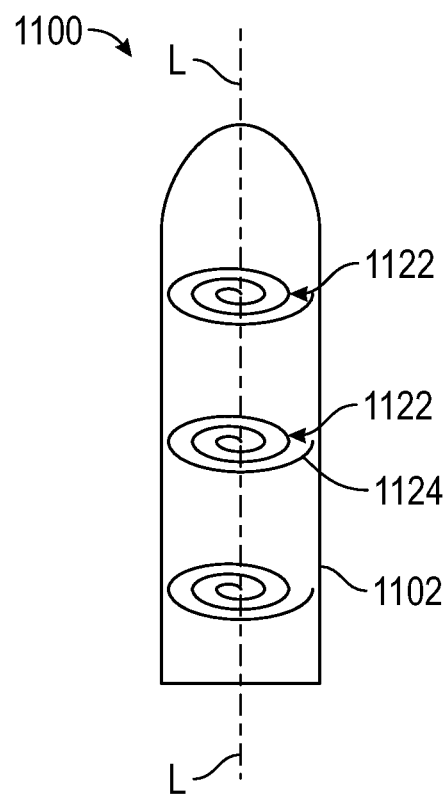
FIGS. 15A and 15B illustrate another tampon having a plurality of internal spiral flow paths.

FIG. 15A illustrates a tampon 1100 that resembles or is identical to the tampon 1000 except as described below. As shown in FIG. 15A, each of the plurality of internal flow paths 1122 lies in a plane perpendicular to the longitudinal axis L. The tampon 1100 may be formed using the same method described above with respect to the tampon 1000 except that the one or more threads 1124 are applied to the folded sliver in a latitudinal direction. The plurality of threads 1124 may be provided in the same direction as the fibers of the carded web.

For a 2.0 g tampon having the internal flow path 1022, 1122, the tampon 1000, 1100 absorb at least about 3.5 grams of fluid per gram of dry absorbent material in the tampon or at least about 3.75 grams of fluid per gram of dry absorbent material in the tampon. For example, tampons 1000, 1100 having internal flow paths 1022, 1122 may absorb between about 3.5 grams and about 3.75 grams or between about 3.75 grams and about 4.0 grams of fluid per gram of dry absorbent material according to the Syngyna test. For a similar sized tampon having the same absorbent material, the internal flow paths 1022, 1122 increases total time to possible leakage by at least 5% to 15%.

In several embodiments, a single tampon may include a combination of any of the flow paths described above. In any of the above-described tampons, the tampon may have the described flow path to the exclusion of any other flow paths, particularly without any longitudinal grooving, substantially longitudinal grooving, or grooving that makes less than a full turn around a circumference of the elongate body. For example, the tampon may have a single, continuous flow path to the exclusion of any other flow paths. The single, continuous flow path may have a single starting point at or near the insertion end of the elongate body and a single termination point at or near the removal end of the elongate body. In any of the above-mentioned external flow paths, the flow path may terminate at the removal end of the elongate body without extending across the end face of the removal end (e.g., the flattened base).

In several embodiments, the above-described tampons improve the efficiency of absorbency compared to similar sized tampons on the market. As a result, the total time that elapses prior to leakage is longer compared to similar sized tampons on the market. For women with a heavier menstrual flow, the tampon designs described herein may allow a user to use a smaller sized tampon or tampon having a lower absorbency rating because the tampon is more likely to reach full saturation before leaking. The smaller sized tampon may be less noticeable to the user and reduce discomfort during removal.

As described above, the annular or spiral flow paths described herein lengthen the total flow path for menstrual material. For women with more viscous menses or blood clots, the flow path provides greater travel for the viscous menstrual material and gives the tampon additional time to absorb the menstrual material. A total length of the flow path can be at least about 100 mm, for example between about 150 mm and about 250 mm or between about 175 mm and about 225 mm. The total length of the flow path can be at least two or three times greater than a length of the elongate body, for example between about three and about five. This reduces the likelihood of possible leakage before full saturation of tampon, so women do not have to continually worry about checking their tampons.

Since the tampons described herein are capable of absorbing a greater amount of fluid before leaking, less frequent replacement of tampons is needed. This lowers the total number of products needed during a menstrual cycle. In several embodiments, the tampons include external flow paths that conform to the rugae along the vaginal walls to prevent displacement of the tampon during active movement. Any of the above-mentioned tampons may also include a sustainable material, such as bamboo that provides higher absorbency and antibacterial properties.

Any of the tampons described herein can be inserted using an applicator or digitally inserted. As the tampon is inserted, the tampon may generally expand in an axial and/or radial direction. For tampons inserted using the applicator, the applicator may be made of a plastic or cardboard material. The applicator may include an outer tubular body and an inner plunger. The outer tubular body may have a smooth surface and/or a rounded end to facilitate insertion. An insertion end of the outer tubular body has an opening for deployment of the tampon. The inner plunger may be slidably disposed within the outer tubular body to facilitate ejection of the tampon. The inner plunger may take the form of an inner tubular body.

Any of the above-described tampons may be provided in a kit. For example, the kit may include a plurality of any of the above-mentioned tampons or a combination of any of the above-mentioned tampons. For any given type of tampon within the kit, there may be tampons having a different absorbency rating. For example, the kit may include one or more tampons of the same type (e.g., absorbent material and/or flow path design) having a light absorbency, regular absorbency, super absorbency, super plus absorbency, and/or ultra-absorbency rating to allow the user to accommodate different levels of flow during a menstrual cycle. Within any given type of tampon, the absorbency may be adjusted based on a mass of the tampon and/or the dimensions of the flow path. The plurality of tampons may be sufficient to last a user for one menstrual cycle or multiple menstrual cycles, for example three menstrual cycles. The kit may include at least two to eight tampons per day of the menstrual cycle. The kit may additionally include one or more liners, pads, and/or period underwear.

Although certain tampons have been described herein in connection with menstrual cycle, the tampons described herein can be used for wound healing, nose bleeds, surgical sites, fecal incontinence, or absorption of any other bodily fluids. In some embodiments, the tampon can be a plug or other body for absorbing bodily fluid. The tampon may take on a shape other than the elongate shape illustrated herein. For example, the tampon may have a conical, bulbous, flattened, or other shaped body.

The ranges disclosed herein also encompass any and all overlap, sub-ranges, and combinations thereof. Language such as "up to," "at least," "greater than," "less than," "between," and the like includes the number recited. Numbers preceded by a term such as "about," "approximately," or "near" include the recited numbers and should be interpreted based on the circumstances (e.g., as accurate as reasonably possible under the circumstances, for example ±1%, ±5%, ±10%, ±15%, etc.). For example, "about 2 mm" includes "2 mm." Phrases preceded by a term such as "substantially" or "generally" include the recited phrase and should be interpreted based on the circumstances (e.g., as much as reasonably possible under the circumstances). For example, "generally longitudinal" includes "longitudinal."

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Although certain embodiments and examples have been described herein, it will be understood by those skilled in the art that many aspects of the tampons shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

The invention claimed is:

1. A tampon comprising:
   an elongate body comprising an insertion end and a removal end opposite the insertion end, a longitudinal axis of the elongate body extending through the insertion end and the removal end;
   a flow path configured to direct menses across the elongate body, the flow path having at least two complete turns about the longitudinal axis of the elongate body;
   a plurality of linear flow paths spaced apart from each other around a circumference of the elongate body, each of the plurality of linear flow paths extending in a longitudinal direction, wherein each of the plurality of linear flow paths crosses successive turns of the flow path; and
   a removal string extending from the removal end of the elongate body.

2. The tampon of claim 1, wherein the flow path is a spiral flow path.

3. The tampon of claim 2, wherein the spiral flow path comprises a first free end at the insertion end of the elongate body and a second free end at the removal end of the elongate body.

4. The tampon of claim 2, wherein successive turns of the spiral flow path have a constant radius.

5. The tampon of claim 1, wherein the flow path comprises a thread.

6. The tampon of claim 1, wherein the flow path comprises a recess.

7. The tampon of claim 1, wherein the flow path extends along an outer surface of the elongate body.

8. The tampon of claim 1, wherein the flow path is a single continuous flow path.

9. The tampon of claim 1, wherein the elongate body comprises a web of fibers, the fibers oriented in a horizontal direction perpendicular to the longitudinal direction.

10. The tampon of claim 9, wherein the web of fibers is rolled in the horizontal direction to form a central core.

11. The tampon of claim 10, further comprising a cover layer provided over the central core.

12. A kit comprising a plurality of tampons, the plurality of tampons comprises at least two different sizes of the tampon of claim 1, the two different sizes of tampons providing different levels of absorbency.

13. The tampon of claim 1, wherein a cross section of the linear flow path comprises an angled shape.

14. A tampon comprising:
   an elongate body comprising an insertion end and a removal end opposite the insertion end, a longitudinal axis of the elongate body extending through the insertion end and the removal end;
   a plurality of flow path segments in an outer surface of the elongate body, the plurality of flow path segments forming a generally spiral flow path comprising at least two complete turns about the longitudinal axis of the elongate body;
   a plurality of linear flow paths extending in a longitudinal direction and separating the plurality of flow path segments; and
   a removal string extending from the removal end of the elongate body;
   wherein each of the plurality of linear flow paths crosses successive turns of the plurality of flow path segments.

15. The tampon of claim 14, wherein the plurality of flow path segments form a single continuous flow path.

16. The tampon of claim 14, wherein the plurality of linear flow paths are spaced apart from each other around a circumference of the elongate body.

17. The tampon of claim 14, wherein the elongate body comprises:
   a central core comprising a web of fibers generally oriented perpendicular to the longitudinal axis; and
   a cover layer provided over the central core.

18. The tampon of claim 17, wherein the web of fibers is rolled in a horizontal direction.

19. The tampon of claim 17, wherein the cover layer is nonwoven.

* * * * *